(12) United States Patent
Watanabe

(10) Patent No.: US 12,259,403 B2
(45) Date of Patent: Mar. 25, 2025

(54) INERTIAL SENSOR MODULE

(71) Applicant: SEIKO EPSON CORPORATION, Tokyo (JP)

(72) Inventor: Toru Watanabe, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/954,768

(22) Filed: Sep. 28, 2022

(65) Prior Publication Data

US 2023/0099306 A1 Mar. 30, 2023

(30) Foreign Application Priority Data

Sep. 30, 2021 (JP) ................................ 2021-160811

(51) Int. Cl.
*G01P 15/14* (2013.01)
*G01P 1/02* (2006.01)
*G01P 15/18* (2013.01)

(52) U.S. Cl.
CPC .............. *G01P 15/14* (2013.01); *G01P 1/023* (2013.01); *G01P 15/18* (2013.01)

(58) Field of Classification Search
CPC .. G01P 15/18; G01P 15/0888; G01P 15/0802; G01P 15/08; G01P 15/14; G01P 1/02; G01P 1/023; G01P 1/006; G01C 19/56
See application file for complete search history.

(56) References Cited

U.S. PATENT DOCUMENTS

| | | | | |
|---|---|---|---|---|
| 2002/0183958 A1* | 12/2002 | McCall | ................ | G01C 21/183 |
| | | | | 702/141 |
| 2005/0000286 A1* | 1/2005 | Campbell | ............... | G01P 15/18 |
| | | | | 701/3 |
| 2005/0062067 A1* | 3/2005 | Kunda | ................ | B81C 1/00269 |
| | | | | 257/202 |
| 2005/0103105 A1* | 5/2005 | Emmerich | .............. | G01P 1/023 |
| | | | | 73/493 |
| 2006/0027026 A1* | 2/2006 | Aoyama | ............. | G01P 15/0802 |
| | | | | 73/777 |
| 2006/0049506 A1* | 3/2006 | Kitao | ....................... | G01P 1/023 |
| | | | | 257/784 |
| 2006/0185432 A1* | 8/2006 | Weinberg | .................. | G01P 3/44 |
| | | | | 73/510 |
| 2007/0132045 A1* | 6/2007 | Tsubaki | ................ | B81B 7/0048 |
| | | | | 257/414 |
| 2008/0066546 A1* | 3/2008 | Katsumata | ............ | G01P 15/125 |
| | | | | 73/504.12 |
| 2008/0196499 A1* | 8/2008 | Li | ........................ | G01P 15/125 |
| | | | | 29/595 |

(Continued)

FOREIGN PATENT DOCUMENTS

JP 2016-031358 A 3/2016

*Primary Examiner* — Helen C Kwok
(74) *Attorney, Agent, or Firm* — Rankin, Hill & Clark LLP

(57) ABSTRACT

Provided is an inertial sensor module having excellent detection accuracy. The inertial sensor module includes: a first sensor having a first axis, a second axis, and a third axis as detection axes; and a second sensor having accuracy higher than that of the first sensor and having the third axis as a detection axis. The first sensor and the second sensor are disposed on an inner bottom surface which is one plane in a package. The first sensor and the second sensor are sealed by the package in an airtight manner.

1 Claim, 16 Drawing Sheets

(56) References Cited

U.S. PATENT DOCUMENTS

| | | | | |
|---|---|---|---|---|
| 2009/0183568 A1* | 7/2009 | Yamanaka | ............ | G01P 15/125 |
| | | | | 73/504.04 |
| 2010/0206075 A1* | 8/2010 | Oshio | ........................ | B81B 7/02 |
| | | | | 73/511 |
| 2015/0040670 A1* | 2/2015 | Yamanaka | .............. | H01L 24/06 |
| | | | | 73/514.35 |
| 2015/0268265 A1* | 9/2015 | Yonezawa | ................ | G01P 15/18 |
| | | | | 73/514.01 |
| 2017/0082654 A1* | 3/2017 | Chau | ................... | G01P 15/0888 |
| 2017/0199217 A1* | 7/2017 | Naruse | ................ | G01P 15/0802 |
| 2019/0101562 A1* | 4/2019 | Kigure | ................. | G01P 15/125 |
| 2019/0162619 A1* | 5/2019 | Furuhata | ............. | G01L 19/148 |
| 2019/0285663 A1* | 9/2019 | Chino | ................. | G01P 15/0888 |
| 2020/0033825 A1* | 1/2020 | Otani | .................... | G05D 1/0088 |
| 2020/0378794 A1* | 12/2020 | Yoda | .................... | G01C 25/005 |
| 2021/0270686 A1* | 9/2021 | Rogers | ................. | G01L 5/0052 |
| 2022/0317146 A1* | 10/2022 | Otani | ..................... | G01P 15/18 |
| 2023/0078589 A1* | 3/2023 | Sakuma | ............. | G01P 15/0888 |
| | | | | 73/510 |
| 2023/0079036 A1* | 3/2023 | Ozawa | .................... | G01P 1/006 |
| | | | | 73/514.01 |
| 2023/0099359 A1* | 3/2023 | Mitsunaga | .......... | G01P 15/0888 |
| | | | | 73/514.02 |
| 2023/0100231 A1* | 3/2023 | Matsuoka | ............ | G01C 21/183 |
| | | | | 73/514.32 |
| 2023/0125187 A1* | 4/2023 | Nishio | ................. | B81B 7/0041 |
| | | | | 257/787 |
| 2023/0194563 A1* | 6/2023 | Watanabe | ................ | G01P 1/12 |
| | | | | 73/1.38 |

* cited by examiner

INERTIAL SENSOR MODULE

The present application is based on, and claims priority from JP Application Serial Number 2021-160811, filed Sep. 30, 2021, the disclosure of which is hereby incorporated by reference herein in its entirety.

BACKGROUND

1. Technical Field

The present disclosure relates to an inertial sensor module.

2. Related Art

In recent years, physical quantity sensors manufactured using a micro electro mechanical systems (MEMS) technique have been developed. As such a physical quantity sensor, for example, JP-A-2016-31358 discloses a physical quantity sensor including a three-axis acceleration sensor and a three-axis gyro sensor at a base substrate.

However, the physical quantity sensor disclosed in JP-A-2016-31358 detects an acceleration and an angular velocity based on capacitance change between a movable electrode and a fixed electrode, but further higher accuracy is required.

SUMMARY

An inertial sensor module includes: a first sensor having a first axis, a second axis, and a third axis as detection axes; and a second sensor having accuracy higher than that of the first sensor and having the third axis as a detection axis. The first sensor and the second sensor are disposed on one plane in a package. The first sensor and the second sensor are sealed by the package in an airtight manner.

DESCRIPTION OF EXEMPLARY EMBODIMENTS

1. First Embodiment

1.1. Inertial Sensor Module

First, an inertial sensor module 1 according to a first embodiment will be described with reference to FIGS. 1 to 4.

Figure 1:
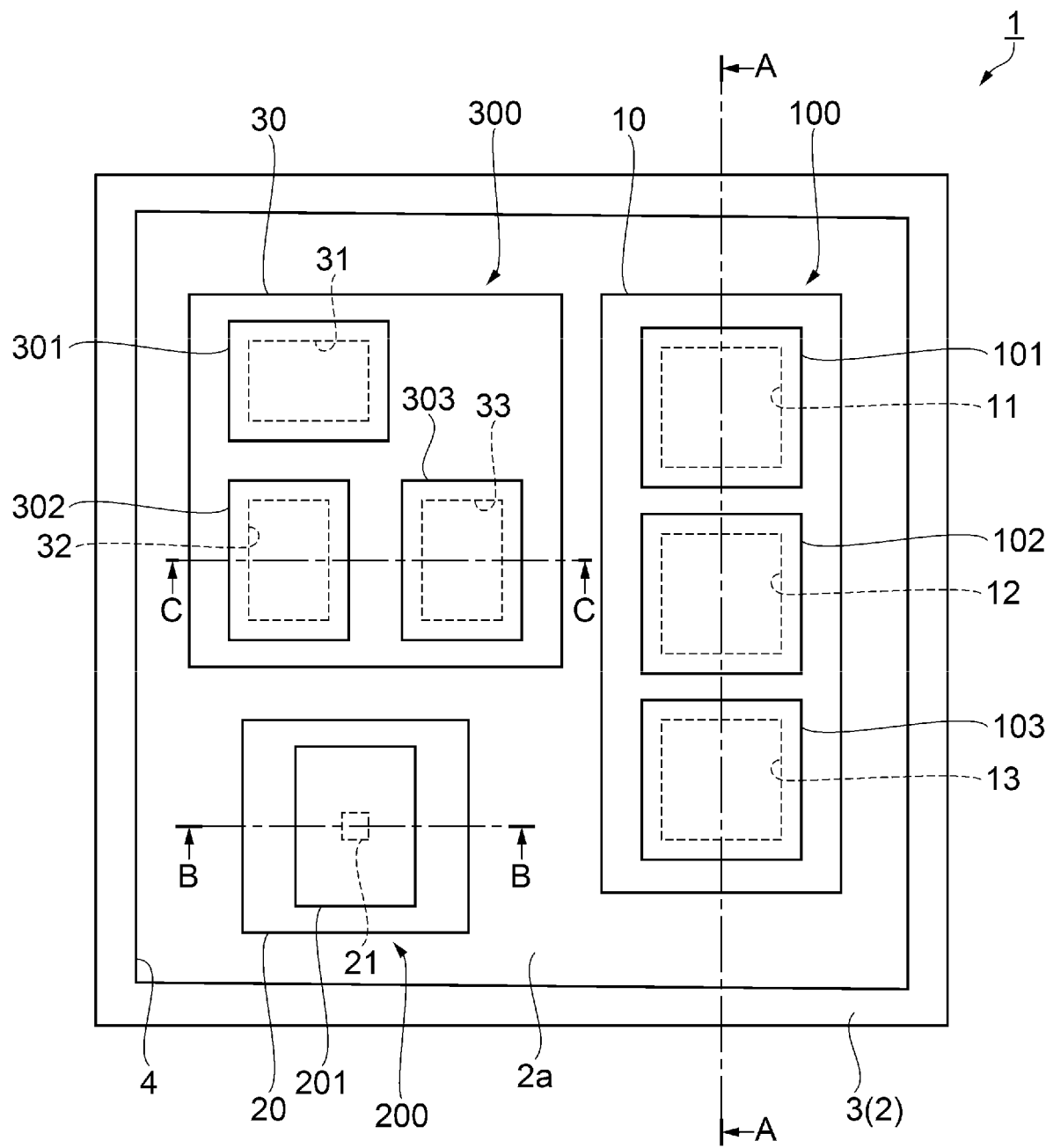
FIG. 1 is a plan view illustrating a schematic structure of an inertial sensor module according to a first embodiment.

For convenience of explanation, a lid body 5 and respective lid bodies 10a, 20a, and 30a of sensors 100, 200, and 300 are not illustrated in FIG. 1. In addition, coupling terminals formed at a back surface 2b of a package 2 and wiring formed at an inner bottom surface 2a and electrically coupling the coupling terminals with the sensors 100, 200, and 300 are not illustrated in FIGS. 1 to 4. Furthermore, in FIGS. 1 to 4, a first gyro sensor element 101, a second gyro sensor element 102, a third gyro sensor element 103, a vibration gyro sensor element 201, a first acceleration sensor element 301, a second acceleration sensor element 302, and a third acceleration sensor element 303 are illustrated in a simplified manner.

In the following plan views and cross-sectional views, an X axis, a Y axis, and a Z axis are illustrated as three axes orthogonal to one another. In the present specification, a first axis is the X axis, a second axis is the Y axis, and a third axis is the Z axis. A direction along the X axis is referred to as an "X direction", a direction along the Y axis is referred to as a "Y direction", and a direction along the Z axis is referred to as a "Z direction". Further, a tip end side of an arrow in each axis direction is referred to as a "positive side", a base end side is referred to as a "negative side", a positive side in the Z direction is referred to as "up", and a negative side in the Z direction is also referred to as "down". The Z direction is along a vertical direction, and an XY plane is along a horizontal plane. In the present specification, a positive direction and a negative direction are collectively referred to as the X direction, the Y direction, and the Z direction.

As illustrated in FIGS. 1 to 4, the inertial sensor module 1 according to the present embodiment includes the package 2 including a base substrate 3 and the lid body 5, the first sensor 100, the second sensor 200, and the third sensor 300. The first sensor 100, the second sensor 200, and the third sensor 300 are accommodated in an internal space S formed by the base substrate 3 and the lid body 5 of the package 2 and are sealed in an airtight manner.

The first sensor 100 is a three-axis physical quantity sensor. A physical quantity is, for example, an angular velocity, while may be an acceleration or another physical quantity. For example, when the physical quantity is an angular velocity, the first sensor 100 is a three-axis angular velocity sensor. For example, when the physical quantity is an acceleration, the first sensor 100 is a three-axis acceleration sensor.

The first sensor 100 according to the present embodiment is a three-axis gyro sensor that includes the first gyro sensor element 101, the second gyro sensor element 102, and the third gyro sensor element 103 and can measure angular velocities around the X axis serving as the first axis, around the Y axis serving as the second axis, and around the Z axis serving as the third axis. The first gyro sensor element 101, the second gyro sensor element 102, and the third gyro sensor element 103 are gyro sensor elements manufactured by processing silicon substrates using an MEMS technique, and detect the angular velocity based on capacitance change between a movable electrode and a fixed electrode.

The second sensor 200 is a physical quantity sensor that can detect a physical quantity with higher accuracy than the first sensor 100. When the first sensor 100 is the three-axis angular velocity sensor, the second sensor 200 may be an angular velocity sensor having one of the three axes of the first sensor 100 as a detection axis. In addition, when the first sensor 100 is the three-axis acceleration sensor, the second sensor 200 may be an acceleration sensor having one of the three axes of the first sensor 100 as the detection axis.

The second sensor 200 according to the present embodiment is a one-axis gyro sensor that includes the vibration gyro sensor element 201 and can measure an angular velocity around the Z axis serving as the third axis. The vibration gyro sensor element 201 is a gyro sensor element manufactured by processing a quartz crystal substrate using a photolithography technique, and converts vibration of a detection vibrating arm into an electric signal to detect the angular velocity. In addition, the vibration gyro sensor element 201 is made of quartz crystal as a base material, and is thus excellent in temperature characteristics. Therefore, as compared to the gyro sensor element manufactured using the MEMS technique, the vibration gyro sensor element 201 is less likely to be affected by external noise and temperature, and has high detection accuracy.

The first sensor 100 is the three-axis angular velocity sensor, and the third sensor 300 is the three-axis acceleration sensor that includes the first acceleration sensor element 301, the second acceleration sensor element 302, and the third acceleration sensor element 303 and can measure an acceleration in each of the X direction as the first axis, the Y direction as the second axis, and the Z direction as the third axis. The first acceleration sensor element 301, the second acceleration sensor element 302, and the third acceleration sensor element 303 are acceleration sensor elements manufactured by using the MEMS technique, and detect the acceleration based on the capacitance change between the movable electrode and the fixed electrode. When the first sensor 100 is the three-axis acceleration sensor, the third sensor 300 may be a three-axis angular velocity sensor. That is, the third sensor 300 may be a sensor different from the first sensor 100. Furthermore, the third sensor 300 may be omitted.

Therefore, the inertial sensor module 1 according to the present embodiment is a six-axis combo-sensor that includes a three-axis gyro sensor, a one-axis gyro sensor, and a three-axis acceleration sensor in the package 2. In addition, the inertial sensor module 1 may be a six-axis combo-sensor that includes a three-axis acceleration sensor, a one-axis acceleration sensor, and a three-axis gyro sensor in the package 2.

The package 2 has a rectangular shape in a plan view, and includes the base substrate 3 and the lid body 5.

The base substrate 3 is formed with a recess 4 recessed downward. The first sensor 100, the second sensor 200, and the third sensor 300 are accommodated in the recess 4. In addition, the first sensor 100, the second sensor 200, and the third sensor 300 are disposed on the inner bottom surface 2a which is the same plane of the base substrate 3. The first sensor 100, the second sensor 200, and the third sensor 300 are electrically coupled to wiring (not illustrated) provided at the inner bottom surface 2a.

Therefore, the first sensor 100, the second sensor 200, and the third sensor 300 are disposed on the inner bottom surface 2a which is one plane in the package 2, and thus the inertial sensor module 1 excellent in axis alignment accuracy can be realized. In particular, by increasing Z-axis alignment accuracy of the third gyro sensor element 103 of the first sensor 100, which detects the angular velocity around the Z axis, and the vibration gyro sensor element 201 of the second sensor 200, which detects the angular velocity around the Z axis with high accuracy, it is possible to achieve high accuracy of measurement on the angular velocity around the Z axis.

As a constituent material of the base substrate 3, various kinds of ceramics such as oxide-based ceramics, nitride-based ceramics, and carbide-based ceramics are preferable, and silicon, glass, or the like may be used.

The lid body 5 is for sealing the first sensor 100, the second sensor 200, and the third sensor 300 that are disposed on the base substrate 3 in an airtight manner by superimposing the lid body 5 on the base substrate 3.

The lid body 5 is bonded to an upper surface of the base substrate 3 via a bonding member (not illustrated) such as glass frit. As a result, the airtight internal space S is formed between the base substrate 3 and the lid body 5, and the first sensor 100, the second sensor 200, and the third sensor 300 are accommodated in the internal space S.

A degree of vacuum of the internal space S is preferably set to 1000 Pa or less, and more preferably set to 100 Pa or more and 500 Pa or less. Furthermore, an atmosphere of the internal space S is not particularly limited, while is preferably an inert atmosphere such as nitrogen or argon. As a result, by reducing aging of the first sensor 100, the second sensor 200, and the third sensor 300, it is possible to improve reliability of the sensors.

As a constituent material of the lid body 5, various kinds of ceramics such as oxide-based ceramics, nitride-based ceramics, and carbide-based ceramics are preferable, and silicon, glass, metal, or the like may be used.

The base substrate 3 and the lid body 5 according to the present embodiment are made of ceramic. Therefore, the package 2 according to the present embodiment is made of ceramic.

Next, the first sensor 100, the second sensor 200, and the third sensor 300 will be described in detail with reference to FIGS. 2 to 11.

1.2. First Sensor

Figure 2:
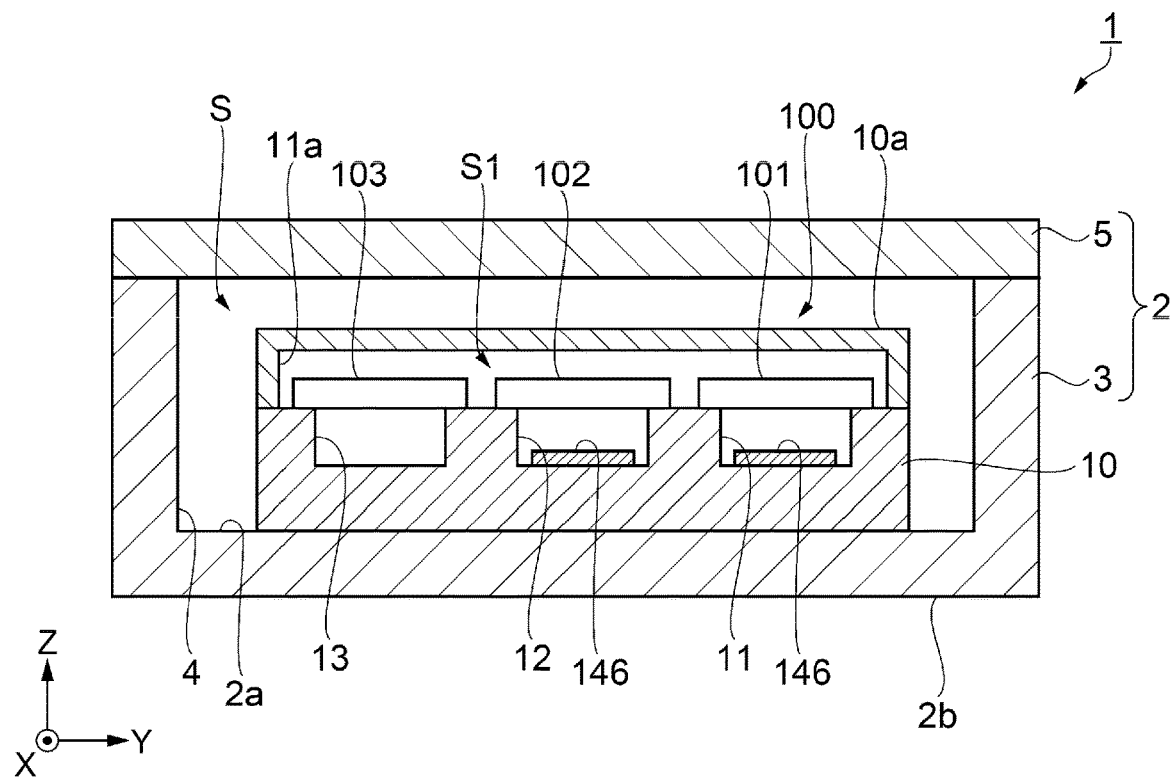
FIG. 2 is a cross-sectional view taken along a line A-A in FIG. 1.

As illustrated in FIG. 2, the first sensor 100 includes a substrate 10, a lid body 10a, the first gyro sensor element 101, the second gyro sensor element 102, and the third gyro sensor element 103. The first gyro sensor element 101, the second gyro sensor element 102, and the third gyro sensor element 103 are accommodated in an internal space S1 formed by the substrate 10 and the lid body 10a. The internal space S1 is an airtight space, and is in a depressurized state, preferably in a state closer to vacuum.

In the first sensor 100, the first gyro sensor element 101 detects the angular velocity around the X axis, the second gyro sensor element 102 detects the angular velocity around the Y axis, and the third gyro sensor element 103 detects the angular velocity around the Z axis.

The substrate 10 is formed with three recesses 11, 12, and 13 recessed downward. The first gyro sensor element 101, the second gyro sensor element 102, and the third gyro sensor element 103 are disposed on the substrate 10 to correspond to the recess 11, the recess 12, and the recess 13, respectively. The recesses 11, 12, and 13 function as relief portions for preventing contact between the gyro sensor elements 101, 102, and 103 and the substrate 10, respectively.

A fixed detection electrode portion 146 that faces the first gyro sensor element 101 is disposed on a bottom surface of the recess 11. The fixed detection electrode portion 146 that faces the second gyro sensor element 102 is disposed on a bottom surface of the recess 12.

The substrate 10 is formed of a glass material containing alkali metal ions, for example, Pyrex (registered trademark) glass as a main material. As a result, the gyro sensor elements 101, 102, and 103 each formed of a silicon substrate can be firmly bonded to the substrate 10 by anodic bonding. In addition, the substrate 10 may be a semiconductor substrate such as silicon. The gyro sensor elements 101, 102, and 103 may be formed by laminating polysilicon or the like on the substrate 10. That is, the gyro sensor elements 101, 102, and 103 may be manufactured by a manufacturing method based on a silicon semiconductor process.

The lid body 10a is formed with a recess 11a recessed upward and is bonded to the substrate 10, and thus the internal space S1 is formed. The first gyro sensor element 101, the second gyro sensor element 102, and the third gyro sensor element 103 can be accommodated in the internal space S1.

In the present embodiment, the lid body 10a is formed of a silicon substrate. As a result, the lid body 10a can be firmly bonded to the substrate 10 by the anodic bonding.

Hereinafter, the first gyro sensor element 101, the second gyro sensor element 102, and the third gyro sensor element 103 will be described.

1.2.1. First Gyro Sensor Element

First, a configuration of the first gyro sensor element 101 will be described with reference to FIG. 5.

Figure 5:
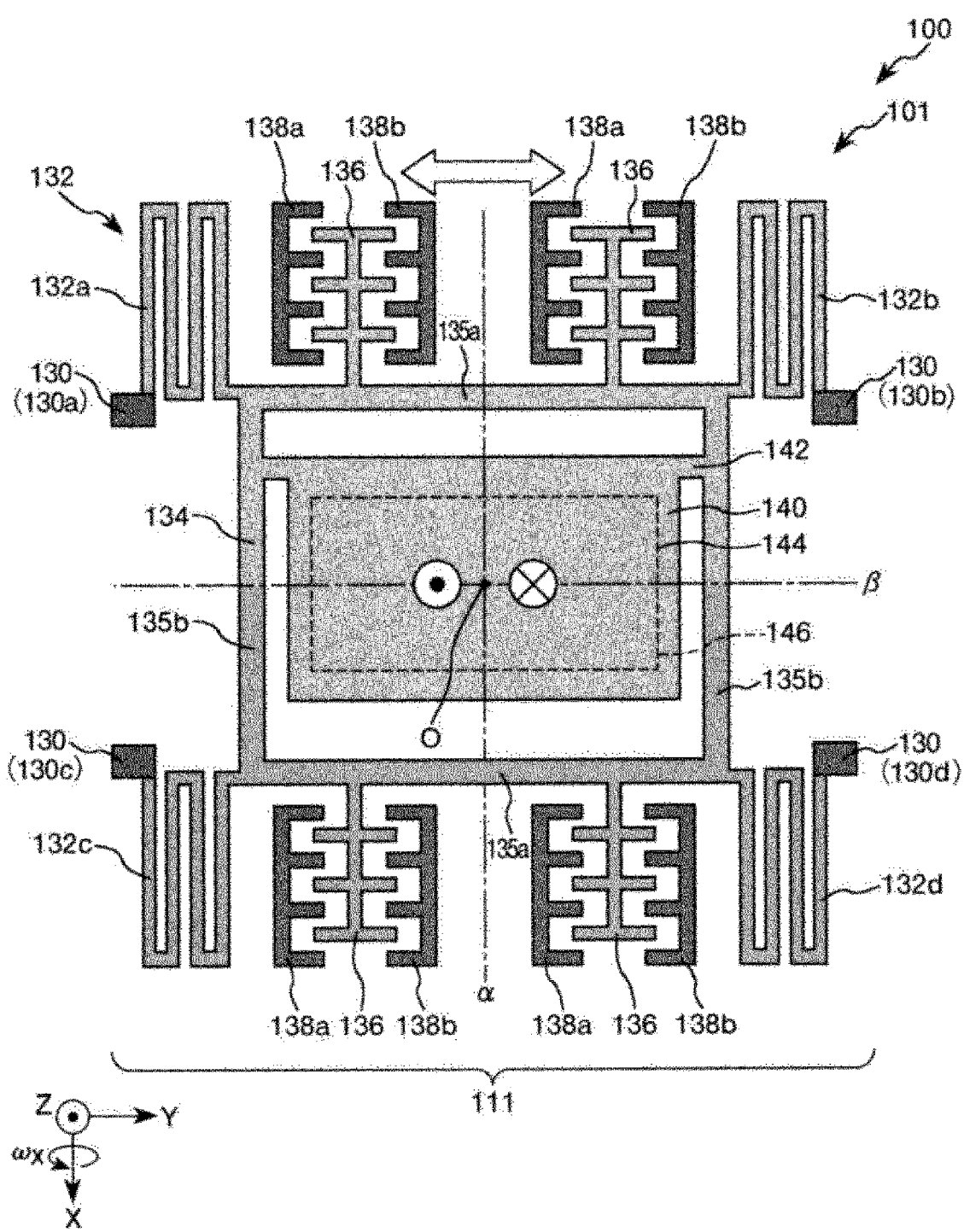
FIG. 5 is a plan view of a first gyro sensor element included in a first sensor of FIG. 1.

As illustrated in FIG. 5, the first gyro sensor element 101 includes a structure 111. The structure 111 includes a vibrating body 134, a movable body 140, and a movable detection electrode portion 144. In FIG. 5, the structure 111 further includes fixed portions 130, a drive spring portion 132, movable drive electrode portions 136, fixed drive electrode portions 138a and 138b, and a beam portion 142.

The fixed portions 130, the drive spring portion 132, the vibrating body 134, the movable drive electrode portions 136, the movable body 140, the beam portion 142, and the movable detection electrode portion 144 are integrally provided, for example, by patterning a silicon substrate.

A material of the fixed portion 130, the drive spring portion 132, the vibrating body 134, the movable drive electrode portion 136, the fixed drive electrode portions 138a and 138b, the movable body 140, the beam portion 142, and the movable detection electrode portion 144 is, for example, silicon to which conductivity is imparted by doping an impurity such as phosphorus and boron.

The vibrating body 134 is provided at the recess 11 of the substrate 10. In the example illustrated in FIG. 5, the vibrating body 134 is a rectangular frame body in the plan view, and includes first extension portions 135a extending in the Y direction and second extension portions 135b extending in the X direction. Side surfaces of the vibrating body 134 in the Y direction are coupled to the drive spring portion 132. The vibrating body 134 can vibrate in the Y direction by the movable drive electrode portions 136 and the fixed drive electrode portions 138a and 138b.

The fixed portions 130 are fixed to the substrate 10. The fixed portions 130 are bonded to an upper surface of the substrate 10 by, for example, the anodic bonding. In the illustrated example, four fixed portions 130 are provided.

The drive spring portion 132 couples the fixed portions 130 (130a, 103b, 130c, and 130d) with the vibrating body 134. In the illustrated example, the drive spring portion 132 includes four springs 132a, 132b, 132c, and 132d. The spring 132a couples the fixed portion 130a and the vibrating body 134. The spring 132b couples the fixed portion 130b and the vibrating body 134. The spring 132c couples the fixed portion 130c and the vibrating body 134. The spring 132d couples the fixed portion 130d and the vibrating body 134.

The springs 132a, 132b, 132c, and 132d extend in the Y direction while reciprocating in the X direction. The spring 132a and the spring 132b are provided symmetrically with respect to an axis α that passes through a center O of the vibrating body 134 and that is parallel to the X axis in the plan view. Similarly, the spring 132c and the spring 132d are symmetrically provided with respect to the axis α. In addition, the spring 132a and the spring 132c are provided symmetrically with respect to an axis β, that passes through the center O of the vibrating body 134 and that is parallel to the Y axis in the plan view. Similarly, the spring 132b and the spring 132d are symmetrically provided with respect to the axis β. As a result, the drive spring portion 132 is prevented from being deformed in the X direction and the Z direction, and can smoothly expand and contract in the Y direction which is a vibration direction of the vibrating body 134.

The movable drive electrode portions 136 are provided in the vibrating body 134. More specifically, the movable drive electrode portions 136 are coupled to the first extension portions 135a of the vibrating body 134. In the illustrated example, four movable drive electrode portions 136 are provided. As illustrated in FIG. 5, each of the movable drive electrode portions 136 is a comb-shaped electrode including a trunk portion extending in the X direction from the vibrating body 134 and a plurality of branch portions extending in the Y direction from the trunk portion.

The fixed drive electrode portions 138a and 138b are fixed to the substrate 10. The fixed drive electrode portions 138a and 138b are bonded to the upper surface of the substrate 10 by, for example, the anodic bonding. The fixed drive electrode portions 138a and 138b are provided to face the movable drive electrode portion 136, and the movable drive electrode portion 136 is disposed between the fixed drive electrode portions 138a and 138b. In the illustrated example, the fixed drive electrode portion 138a is provided on a negative Y direction side of the movable drive electrode portion 136, and the fixed drive electrode portion 138b is provided on a positive Y direction side of the movable drive electrode portion 136. As illustrated in FIG. 5, the movable drive electrode portion 136 has a comb shape, whereas shapes of the fixed drive electrode portions 138a and 138b are comb shape corresponding to the shape of the movable drive electrode portion 136.

The movable body 140 is provided at the recess 11. The movable body 140 is supported by the vibrating body 134 via the beam portion 142. In the plan view, the movable body 140 is provided inside the frame-shaped vibrating body 134. The movable body 140 has a plate shape. The movable body 140 is coupled to a side surface in the Y direction of each second extension portion 135b of the vibrating body 134 by the beam portion 142 serving as a rotation shaft.

The beam portion 142 is provided at a position shifted from a center of gravity of the movable body 140. The beam portion 142 is provided along the Y axis. The beam portion 142 can be torsionally deformed, and the movable body 140 can be displaced in the Z direction by this torsional deformation. In the illustrated example, the movable body 140 extends from the beam portion 142 in a positive X direction, while an extending direction of the movable body 140 is not particularly limited.

The movable detection electrode portion 144 is provided in the movable body 140. In the illustrated example, the movable detection electrode portion 144 is a portion of the movable body 140 that overlaps the fixed detection electrode portion 146 in the plan view. The movable detection electrode portion 144 is a portion of the movable body 140 that forms an electrostatic capacitance between the movable body 140 and the fixed detection electrode portion 146. In the first gyro sensor element 101, the movable body 140 may be made of a conductive material, and thus the movable detection electrode portion 144 is provided, or the movable detection electrode portion 144 made of a conductive layer of metal or the like may be provided on a surface of the movable body 140. In the illustrated example, the movable body 140 is made of a conductive material, for example, silicon doped with an impurity, and thus the movable detection electrode portion 144 is provided.

The fixed detection electrode portion 146 is disposed on the substrate 10 and provided to face the movable detection electrode portion 144. The fixed detection electrode portion 146 is provided, for example, on the bottom surface of the recess 11. In the example illustrated in FIG. 5, a planar shape of the fixed detection electrode portion 146 is a rectangle.

As a material of the fixed detection electrode portion 146, for example, a simple metal such as Au, Pt, Ag, Cu, Al, In, Zn, Pt, Sn, or the like, an alloy containing these simple metals or a conductive oxide is preferably used. When the substrate 10 is a transparent glass substrate by using a transparent electrode material such as indium tin oxide (ITO) as the fixed detection electrode portion 146, a foreign substance or the like present on the fixed detection electrode portion 146 can be easily visually recognized from a lower side of the base substrate 3.

Next, operations of the first gyro sensor element 101 will be described.

When a voltage is applied between the movable drive electrode portion 136 and the fixed drive electrode portions 138a and 138b, an electrostatic force can be generated between the movable drive electrode portion 136 and the fixed drive electrode portions 138a and 138b. As a result, it is possible to vibrate the vibrating body 134 in the Y direction while expanding and contracting the drive spring portion 132 in the Y direction. By reducing a distance between the movable drive electrode portion 136 and the fixed drive electrode portions 138a and 138b, it is possible to increase the electrostatic force acting between the movable drive electrode portion 136 and the fixed drive electrode portions 138a and 138b.

More specifically, a first alternating voltage is applied between the movable drive electrode portion 136 and the fixed drive electrode portion 138a, and a second alternating voltage whose phase is shifted by 180° from that of the first alternating voltage is applied between the movable drive electrode portion 136 and the fixed drive electrode portion 138b.

As described above, the movable body 140 is supported by the vibrating body 134 via the beam portion 142, and thus the movable body 140 also vibrates in the Y direction in accordance with the vibration of vibrating body 134.

When an angular velocity ωx around the X axis is applied to the first gyro sensor element 101 in a state where the vibrating body 134 vibrates in the Y direction, a Coriolis force acts, and the movable body 140 is displaced in the Z direction. The movable body 140 is displaced in the Z direction, and thus the movable detection electrode portion 144 approaches or separates from the fixed detection electrode portion 146. Therefore, an electrostatic capacitance C11 between the movable detection electrode portion 144 and the fixed detection electrode portion 146 changes. The angular velocity ωx around the X axis can be obtained by detecting a change amount of the electrostatic capacitance C11 between the movable detection electrode portion 144 and the fixed detection electrode portion 146.

An electrostatic driving method in which the vibrating body 134 is driven by the electrostatic force is described above, while a method for driving the vibrating body 134 is not particularly limited, and a piezoelectric driving method, an electromagnetic driving method using Lorentz force of a magnetic field, or the like can be applied.

1.2.2. Second Gyro Sensor Element

Next, the second gyro sensor element 102 will be described with reference to FIG. 6.

Figure 6:
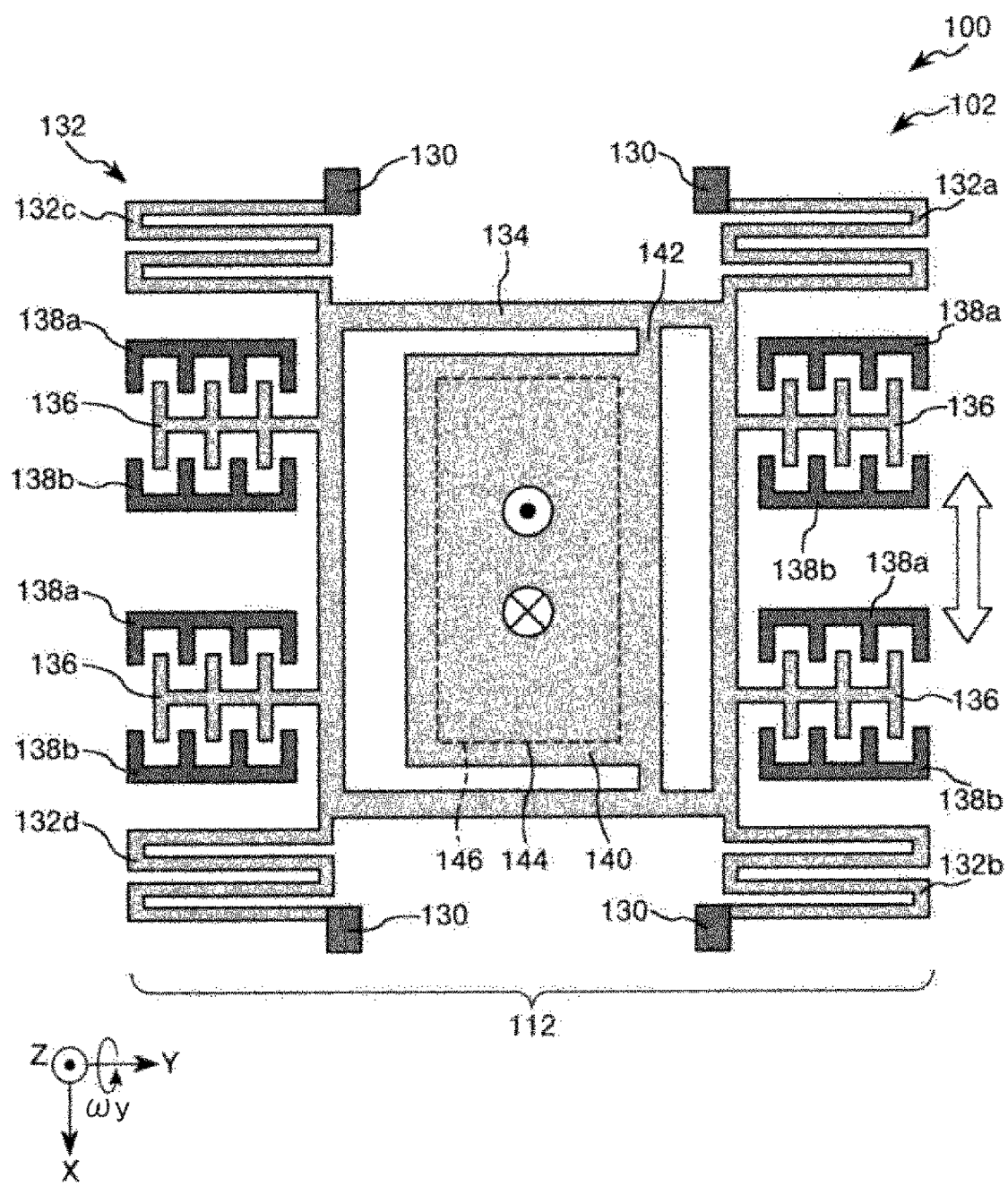
FIG. 6 is a plan view of a second gyro sensor element included in the first sensor of FIG. 1.

As illustrated in FIG. 6, the second gyro sensor element 102 includes a structure 112. The structure 112 includes the vibrating body 134, the movable body 140, and the movable detection electrode portion 144. In FIG. 6, the second gyro sensor element 102 further includes the fixed portions 130, the drive spring portion 132, the movable drive electrode portions 136, the fixed drive electrode portions 138a and 138b, and the beam portion 142.

The vibrating body 134 and the movable body 140 of the second gyro sensor element 102 are provided at the recess 12. The fixed detection electrode portion 146 for the second gyro sensor element 102 is provided, for example, on the bottom surface of the recess 12.

As illustrated in FIG. 6, the second gyro sensor element 102 is in a form in which the first gyro sensor element 101 illustrated in FIG. 5 is rotated 90° with the Z axis as a rotation axis. Therefore, detailed descriptions of the second gyro sensor element 102 will be omitted.

In the second gyro sensor element 102, when an angular velocity ωy around the Y axis is applied in a state where the vibrating body 134 vibrates in the X direction, the Coriolis force acts, and the movable body 140 is displaced in the Z direction. As a result, an electrostatic capacitance C12 between the movable detection electrode portion 144 and the fixed detection electrode portion 146 changes, and the angular velocity ωy around the Y axis can be obtained.

1.2.3. Third Gyro Sensor Element

Next, a configuration of the third gyro sensor element 103 will be described with reference to FIG. 7.

Hereinafter, in the third gyro sensor element 103 illustrated in FIG. 7, members having the same functions as those of constituent members of the first gyro sensor element 101 illustrated in FIG. 5 are denoted by the same reference numerals, and detailed descriptions thereof will be omitted.

Figure 7:
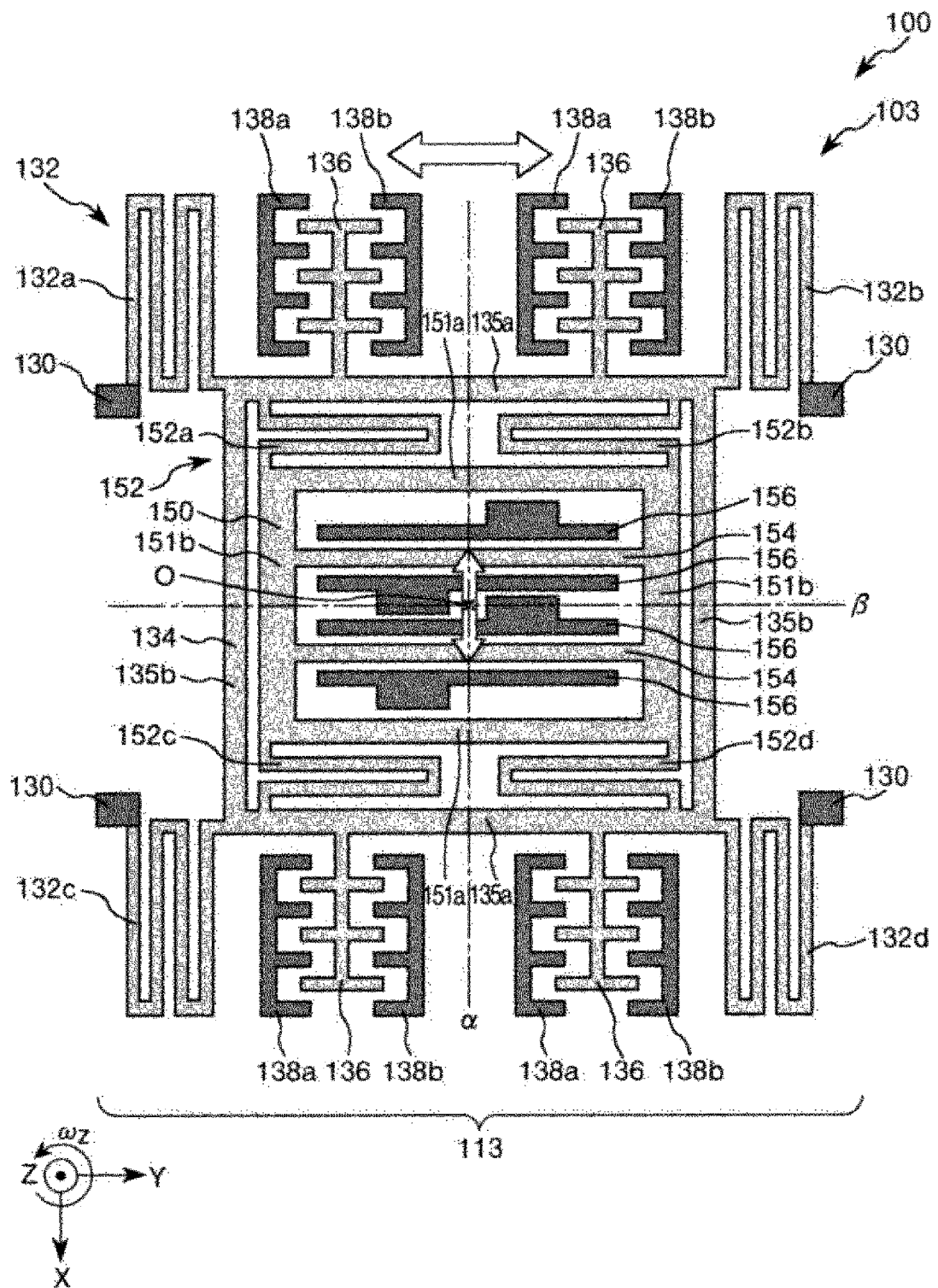
FIG. 7 is a plan view of a third gyro sensor element included in the first sensor of FIG. 1.

As illustrated in FIG. 7, the third gyro sensor element 103 includes a structure 113. The structure 113 includes the vibrating body 134, a movable body 150, movable detection electrode portions 154, and fixed detection electrode portions 156. In FIG. 7, the structure 113 further includes the fixed portions 130, the drive spring portion 132, the movable drive electrode portions 136, the fixed drive electrode portions 138a and 138b, and a detection spring portion 152.

The movable body 150 is provided at the recess 13. The movable body 150 is supported by the vibrating body 134 via the detection spring portion 152. In the plan view, the movable body 150 is provided inside the frame-shaped vibrating body 134. In the example illustrated in FIG. 7, the movable body 150 is a rectangular frame body in the plan view, and includes third extension portions 151a extending in the Y direction and fourth extension portions 151b extending in the X direction. Side surfaces of the movable body 150 in the X direction are coupled to the detection spring portion 152.

The detection spring portion 152 couples the vibrating body 134 with the movable body 150. In the illustrated example, the detection spring portion 152 includes four springs 152a, 152b, 152c, and 152d. The springs 152a and 152b couple the movable body 150 with the first extension portion 135a disposed in a negative X direction side of the movable body 150. The springs 152c and 152d couple the movable body 150 with the first extension portion 135a disposed in a positive X direction side of the movable body 150.

The springs 152a, 152b, 152c, and 152d extend in the X direction while reciprocating in the Y direction. The spring 152a and the spring 152b are provided symmetrically with respect to the axis α that passes through the center O of the vibrating body 134 and that is parallel to the X axis in the plan view. Similarly, the spring 152c and the spring 152d are symmetrically provided with respect to the axis α. In addition, the spring 152a and the spring 152c are provided symmetrically with respect to the axis β that passes through the center O of the vibrating body 134 and that is parallel to the Y axis in the plan view. Similarly, the spring 152b and the spring 152d are symmetrically provided with respect to the axis β. As a result, the detection spring portion 152 is prevented from being deformed in the Y direction and the Z direction, and can smoothly expand and contract in the X direction which is a displacement direction of the movable body 150.

The movable detection electrode portions 154 are provided in the movable body 150. Each of the movable detection electrode portions 154, for example, extends in the Y direction from one fourth extension portion 151b to the other fourth extension portion 151b of the movable body 150. In the illustrated example, two movable detection electrode portions 154 are provided.

The fixed detection electrode portion 156 is fixed to the substrate 10 and provided to face the corresponding movable detection electrode portion 154. The fixed detection electrode portion 156 is bonded to a bottom surface of the recess 13 by, for example, the anodic bonding. The fixed detection electrode portion 156 is provided inside the frame-shaped movable body 150. In the illustrated example, the fixed detection electrode portions 156 are provided with the movable detection electrode portion 154 interposed therebetween.

The fixed portions 130, the drive spring portion 132, the vibrating body 134, the movable drive electrode portions 136, the movable body 150, the detection spring portion 152, and the movable detection electrode portions 154 are integrally provided, for example, by patterning a silicon substrate. A material of the fixed portion 130, the drive spring portion 132, the vibrating body 134, the movable drive electrode portion 136, the fixed drive electrode portions 138a and 138b, the movable body 150, the detection spring portion 152, the movable detection electrode portion 154, and the fixed detection electrode portion 156 is, for example, silicon to which conductivity is imparted by doping an impurity such as phosphorus and boron.

Next, operations of the third gyro sensor element 103 will be described.

When a voltage is applied between the movable drive electrode portion 136 and the fixed drive electrode portions 138a and 138b, an electrostatic force can be generated between the movable drive electrode portion 136 and the fixed drive electrode portions 138a and 138b. As a result, it is possible to vibrate the vibrating body 134 in the Y direction while expanding and contracting the drive spring portion 132 in the Y direction.

As described above, the movable body 150 is supported by the vibrating body 134 via the detection spring portion 152, and thus the movable body 150 also vibrates in the Y direction in accordance with the vibration of the vibrating body 134.

When an angular velocity ωz around the Z axis is applied to the third gyro sensor element 103 in a state where the vibrating body 134 vibrates in the Y direction, the Coriolis force acts, and the movable body 150 is displaced in the X direction. The movable body 150 is displaced in the X direction, and thus a distance between the movable detection electrode portion 154 and the fixed detection electrode portion 156 changes. Therefore, an electrostatic capacitance C13 between the movable detection electrode portion 154 and the fixed detection electrode portion 156 changes. The angular velocity ωz around the Z axis can be obtained by detecting a change amount of the electrostatic capacitance C13 between the movable detection electrode portion 154 and the fixed detection electrode portion 156.

As described above, the angular velocities around the X axis, the Y axis, the Z axis, which are the three axes orthogonal to one another, can be measured by the first sensor 100.

1.3. Second Sensor

Figure 3:
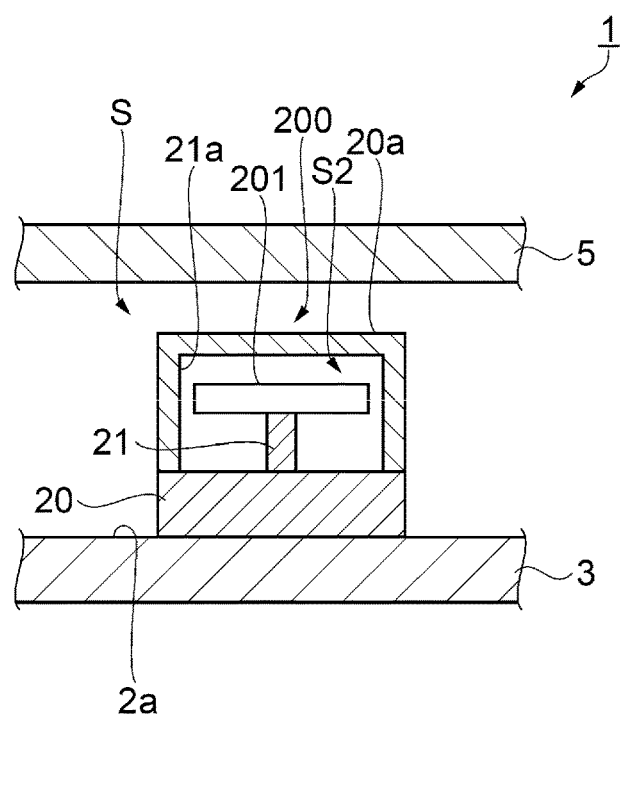
FIG. 3 is a cross-sectional view taken along a line B-B in FIG. 1.

As illustrated in FIG. 3, the second sensor 200 includes a substrate 20, a lid body 20a, and the vibration gyro sensor element 201. The vibration gyro sensor element 201 is accommodated in an internal space S2 formed by the substrate 20 and the lid body 20a. In addition, the internal space S2 is an airtight space, and is in a depressurized state, preferably in a state closer to vacuum.

In the second sensor 200, the vibration gyro sensor element 201 detects the angular velocity around the Z axis which is the third axis.

The vibration gyro sensor element 201 is formed of a quartz crystal, which is a piezoelectric material, as a base material. The quartz crystal includes an X axis called an electric axis, a Y axis called a mechanical axis, and a Z axis called an optical axis.

A quartz crystal substrate forming the vibration gyro sensor element 201 is cut out along a plane defined by the X axis and the Y axis orthogonal to a quartz crystal axis, is processed into a plate shape, and has a predetermined thickness in the Z-axis direction orthogonal to the plane. The predetermined thickness is appropriately set according to a resonance frequency, an outer size, processability, and the like.

The vibration gyro sensor element 201 is formed by etching using the photolithography technique. A plurality of vibration gyro sensor elements 201 can be taken from one quartz crystal substrate.

In the plan view, the substrate 20 is formed with a projection 21 protruding upward at a center of the substrate 20, and the vibration gyro sensor element 201 is disposed on an upper surface of the projection 21. Therefore, it is possible to prevent contact between the vibration gyro sensor element 201 and the substrate 20.

The lid body 20a is formed with a recess 21a recessed upward and is bonded to the substrate 20, and thus the internal space S2 is formed. The vibration gyro sensor element 201 can be accommodated in the internal space S2.

Next, a configuration of the vibration gyro sensor element 201 will be described with reference to FIG. 8.

Figure 8:
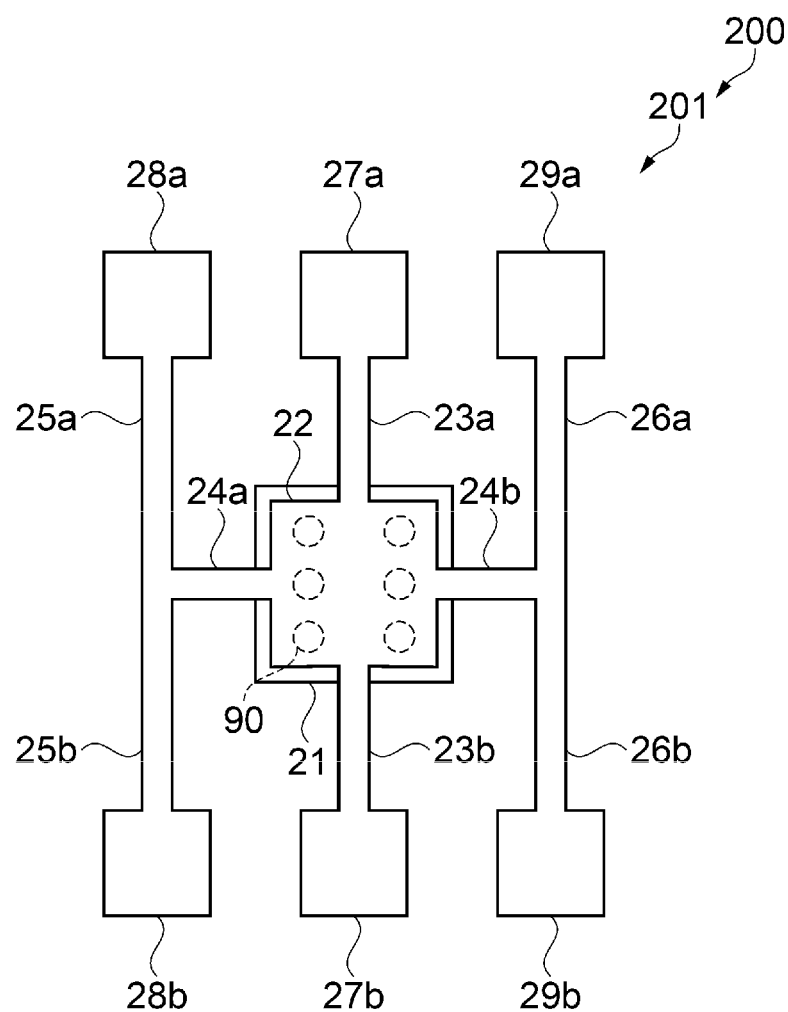
FIG. 8 is a plan view of a vibration gyro sensor element included in a second sensor of FIG. 1.
Figure 8:
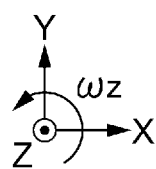

As illustrated in FIG. 8, the vibration gyro sensor element 201 has a configuration called a double T type.

The vibration gyro sensor element 201 includes a base portion 22 located in a central portion, a pair of detection vibrating arms 23a and 23b extending from the base portion 22 in the Y direction, a pair of coupling arms 24a and 24b extending from the base portion 22 in the X direction to be orthogonal to the detection vibrating arms 23a and 23b, and pairs of drive vibrating arms 25a and 25b, and 26a and 26b respectively extending from tip end sides of the coupling arms 24a and 24b in the Y direction to be parallel to the detection vibrating arms 23a and 23b.

In addition, in the vibration gyro sensor element 201, a detection electrode (not illustrated) is formed in each of the detection vibrating arms 23a and 23b, and a drive electrode (not illustrated) is formed in each of the drive vibrating arms 25a, 25b, 26a, and 26b.

The vibration gyro sensor element 201 implements, by the detection vibrating arms 23a and 23b, a detection vibration system that detects an angular velocity, and implements, by the coupling arms 24a and 24b and the drive vibrating arms 25a, 25b, 26a, and 26b, a drive vibration system that drives the vibration gyro sensor element 201.

Weight portions 27a and 27b are formed at respective tip end portions of the detection vibrating arms 23a and 23b. Weight portions 28a, 28b, 29a, and 29b are formed at respective tip end portions of the drive vibrating arms 25a, 25b, 26a, and 26b.

As a result, the vibration gyro sensor element 201 is reduced in size and improved in angular velocity detection sensitivity.

In the plan view, the vibration gyro sensor element 201 is disposed to overlap the projection 21 provided on the substrate 20 and protruding upward. Specifically, the base portion 22 and the projection 21 are disposed to overlap each other.

An extraction electrode (not illustrated) extracted from each detection electrode and each drive electrode is formed on a surface of the base portion 22 of the vibration gyro sensor element 201 facing the projection 21. Each extraction electrode and an external coupling terminal (not illustrated) formed at a surface of the projection 21 facing the base portion 22 are electrically and mechanically coupled to each other via a metal bump 90 or the like.

As a result, the vibration gyro sensor element 201 is held by the substrate 20.

Here, operations of the vibration gyro sensor element 201 of the second sensor 200 will be described.

As for a drive vibration state of the vibration gyro sensor element 201, when a drive signal is applied from an outside, the drive vibrating arms 25a, 25b, 26a, and 26b perform bending vibration in the X direction in a state where an angular velocity is not applied. The drive vibrating arms 25a and 25b and the drive vibrating arms 26a and 26b vibrate in opposite phases.

Next, in a state where this drive vibration is performed, when the angular velocity ωz around the Z axis is applied to the vibration gyro sensor element 201, in the vibration gyro sensor element 201, a Coriolis force in the Y direction acts on the drive vibrating arms 25a, 25b, 26a, and 26b and the coupling arms 24a and 24b that implement the drive vibration system. The Coriolis force in the Y direction acts on the drive vibrating arms 25a and 25b and the coupling arm 24a, and the drive vibrating arms 26a and 26b and the coupling arm 24b in opposite phases. In addition, at the same time, the detection vibrating arm 23a is deformed in the positive X direction in response to a Coriolis force in a negative Y direction, and the detection vibrating arm 23b is deformed in a negative X direction in response to a Coriolis force in a positive Y direction.

Thereafter, the Coriolis force, which is a force returning in a direction opposite to the Y direction, acts on each of the drive vibrating arms 25a, 25b, 26a, and 26b and the coupling arms 24a and 24b. In addition, at the same time, the detection vibrating arm 23a is deformed in the negative X direction in response to the Coriolis force in the positive Y direction, and the detection vibrating arm 23b is deformed in the positive X direction in response to the Coriolis force in the negative Y direction.

In the vibration gyro sensor element 201, when the angular velocity ωz around the Z axis is applied, this series of operations are alternately repeated to generate new bending vibration in the detection vibrating arms 23a and 23b.

Then, in the vibration gyro sensor element 201, the angular velocity ωz is obtained by the detection electrodes formed on the detection vibrating arms 23a and 23b detecting a distortion of the quartz crystal generated by the vibration as an electric signal.

As described above, the angular velocity around the Z axis can be measured by the second sensor 200 with high accuracy.

1.4. Third Sensor

Figure 4:
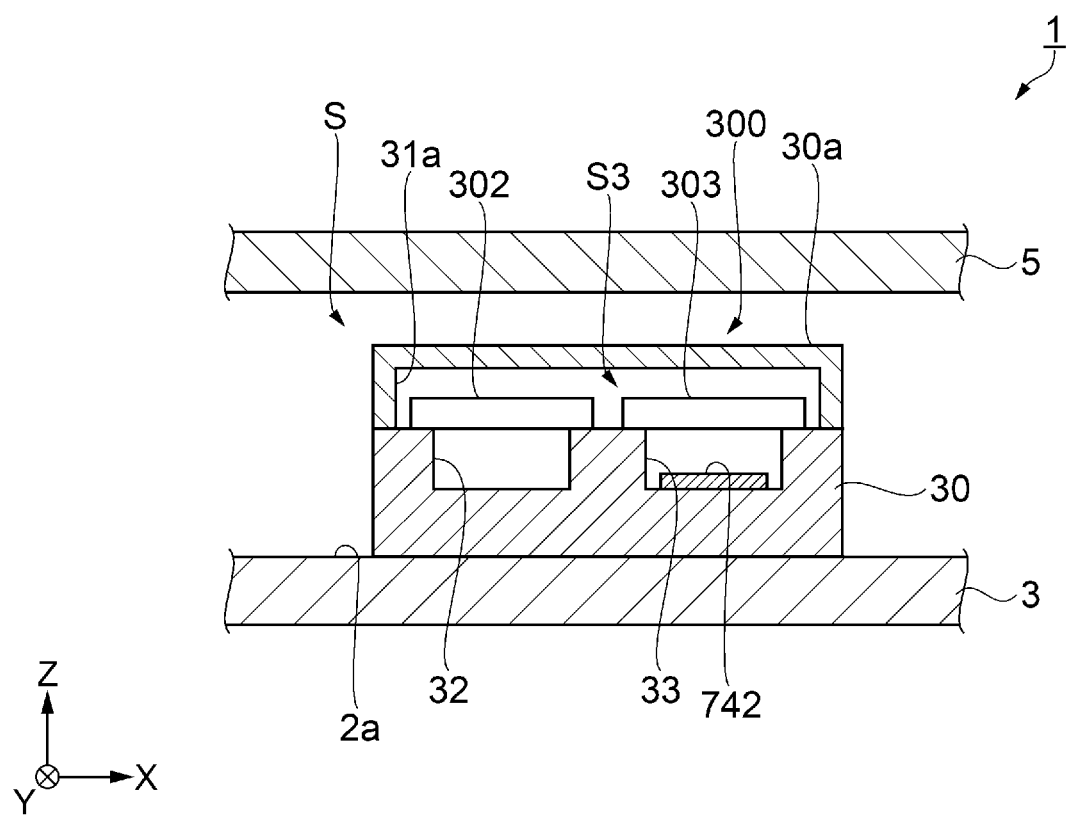
FIG. 4 is a cross-sectional view taken along a line C-C in FIG. 1.

As illustrated in FIGS. 1 and 4, the third sensor 300 includes a substrate 30, a lid body 30a, the first acceleration sensor element 301, the second acceleration sensor element 302, and the third acceleration sensor element 303. The first acceleration sensor element 301, the second acceleration sensor element 302, and the third acceleration sensor element 303 are accommodated in an internal space S3 formed by the substrate 30 and the lid body 30a. The internal space S3 is an airtight space in which an inert gas such as nitrogen, helium, and argon is sealed, and it is preferable that the internal space S3 has a use temperature of about −40° C. to 125° C. and is almost atmospheric pressure. Meanwhile, an atmosphere of the internal space S3 is not particularly limited, and may be, for example, in a depressurized state or a pressurized state.

In the third sensor 300, the first acceleration sensor element 301 detects an acceleration in the X direction, the second acceleration sensor element 302 detects an acceleration in the Y direction, and the third acceleration sensor element 303 detects an acceleration in the Z direction.

The substrate 30 is formed with three recesses 31, 32, and 33 recessed downward, and the first acceleration sensor element 301, the second acceleration sensor element 302, and the third acceleration sensor element 303 are disposed on the substrate 30 to correspond to the recess 31, the recess 32, and the recess 33, respectively. The recesses 31, 32, and 33 function as relief portions for preventing contact between the acceleration sensor elements 301, 302, and 303 and the substrate 30, respectively.

A first detection electrode 741 and a second detection electrode 742 that face the third acceleration sensor element 303 are disposed on a bottom surface of the recess 33.

The substrate 30 is formed of a glass material containing alkali metal ions, for example, Pyrex (registered trademark) glass as a main material. As a result, the acceleration sensor elements 301, 302, and 303 each formed of a silicon substrate can be firmly bonded to the substrate 30 by the anodic bonding. In addition, the substrate 30 may be a semiconductor substrate such as silicon. The acceleration sensor elements 301, 302, and 303 may be formed by laminating polysilicon or the like on the substrate 30. That is, the acceleration sensor elements 301, 302, and 303 may be manufactured by a manufacturing method based on a silicon semiconductor process.

The lid body 30a is formed with a recess 31a recessed upward and bonded to the substrate 30, and thus the internal space S3 is formed. The first acceleration sensor element 301, the second acceleration sensor element 302, and the third acceleration sensor element 303 can be accommodated in the internal space S3.

In the present embodiment, the lid body 30a is formed of a silicon substrate. As a result, the lid body 30a can be firmly bonded to the substrate 30 by the anodic bonding.

Hereinafter, the first acceleration sensor element 301, the second acceleration sensor element 302, and the third acceleration sensor element 303 will be described.

1.4.1. First Acceleration Sensor Element

First, a configuration of the first acceleration sensor element 301 will be described with reference to FIG. 9.

Figure 9:
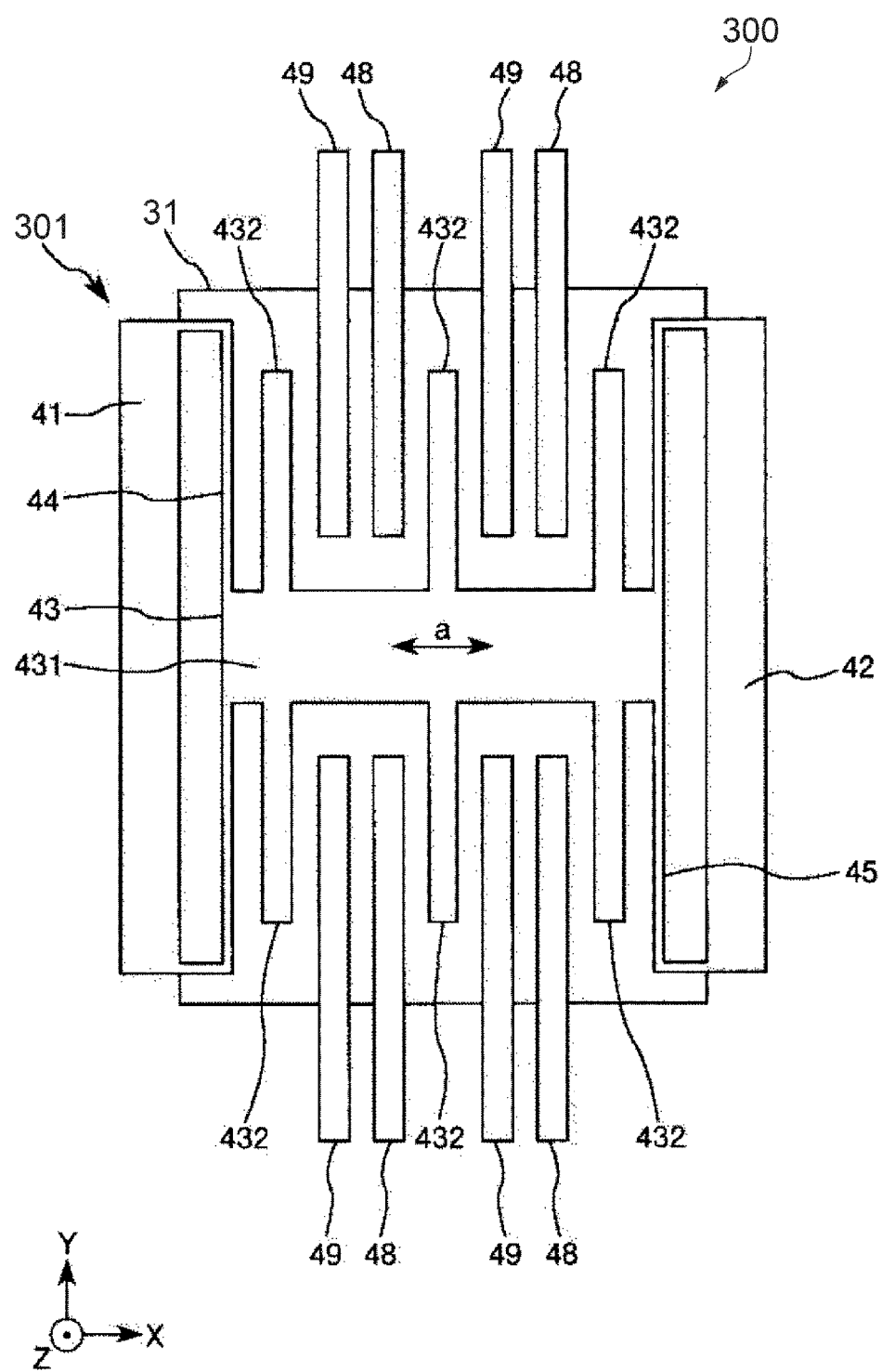
FIG. 9 is a plan view of a first acceleration sensor element included in a third sensor of FIG. 1.

As illustrated in FIG. 9, the first acceleration sensor element 301 includes support portions 41 and 42, a movable portion 43, coupling portions 44 and 45, a plurality of first fixed electrode fingers 48, and a plurality of second fixed electrode fingers 49. The movable portion 43 includes a base portion 431 and a plurality of movable electrode fingers 432 protruding from the base portion 431 to both sides in the Y direction. The first acceleration sensor element 301 is formed of, for example, a silicon substrate doped with an impurity such as phosphorus or boron.

The support portions 41 and 42 are bonded to an upper surface of the substrate 30 and electrically coupled to wiring (not illustrated), respectively. The movable portion 43 is provided between these support portions 41 and 42. The movable portion 43 is coupled to the support portion 41 via the coupling portion 44 in the negative X direction side, and is coupled to the support portion 42 via the coupling portion 45 in the positive X direction side. Accordingly, the movable portion 43 can be displaced in the X direction relative to the support portions 41 and 42 as indicated by an arrow a.

The plurality of first fixed electrode fingers 48 are disposed on one side of the movable electrode fingers 432 in the X direction and are arranged to form a comb shape that meshes with the respective movable electrode fingers 432 at intervals. The plurality of first fixed electrode fingers 48 are bonded to the upper surface of the substrate 30 at their base end portions.

On the other hand, the plurality of second fixed electrode fingers 49 are disposed on the other side of the movable electrode fingers 432 in the X direction and are arranged to form a comb shape that meshes with the respective movable electrode fingers 432 at intervals. The plurality of second fixed electrode fingers 49 are bonded to the upper surface of the substrate 30 at their base end portions.

The first acceleration sensor element 301 detects the acceleration in the X direction in the following manner. That is, when the acceleration in the X direction is applied to the inertial sensor module 1, the movable portion 43 is displaced in the X direction while elastically deforming the coupling portions 44 and 45 based on a magnitude of the acceleration. A magnitude of an electrostatic capacitance C1 between the movable electrode fingers 432 and the first fixed electrode finger 48 and a magnitude of an electrostatic capacitance C2 between the movable electrode fingers 432 and the second fixed electrode finger 49 change in accordance with such displacement. Therefore, the acceleration can be detected based on change amounts of these electrostatic capacitances C1 and C2.

1.4.2. Second Acceleration Sensor Element

Next, a configuration of the second acceleration sensor element 302 will be described with reference to FIG. 10.

Figure 10:
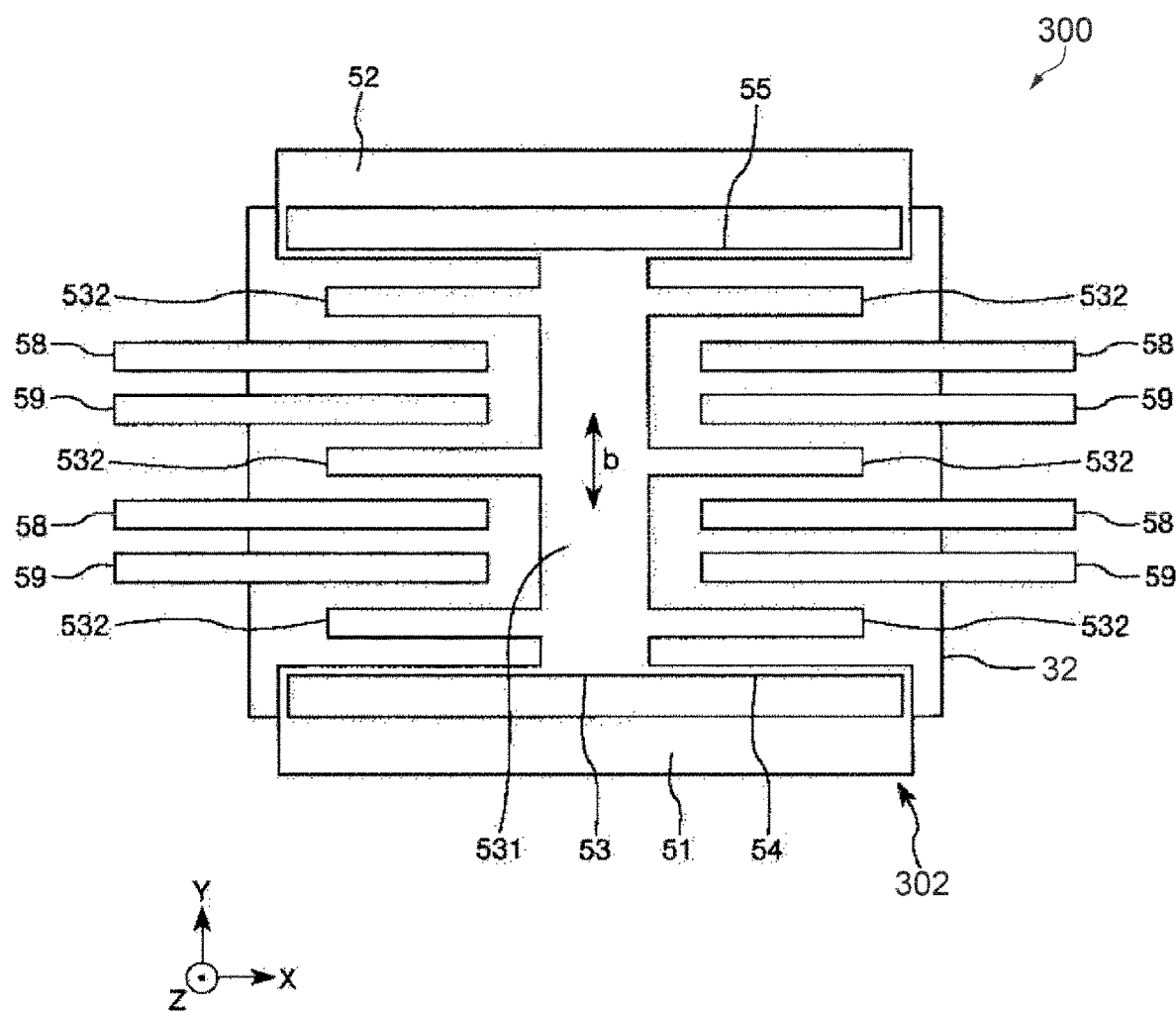
FIG. 10 is a plan view of a second acceleration sensor element included in the third sensor of FIG. 1.

As illustrated in FIG. 10, the second acceleration sensor element 302 has the same configuration as that of the first acceleration sensor element 301 except that the second acceleration sensor element 302 is disposed in a state of being rotated by 90° in the plan view. That is, the second acceleration sensor element 302 includes support portions 51 and 52, a movable portion 53, coupling portions 54 and 55, a plurality of first fixed electrode fingers 58, and a plurality of second fixed electrode fingers 59. The movable portion 53 includes a base portion 531 and a plurality of movable electrode fingers 532 protruding from the base portion 531 to both sides in the X direction.

Each of the support portions 51 and 52 is bonded to the upper surface of the substrate 30. The movable portion 53 is provided between these support portions 51 and 52. The movable portion 53 is coupled to the support portion 51 via the coupling portion 54 in the negative Y direction side, and is coupled to the support portion 52 via the coupling portion 55 in the positive Y direction side. Accordingly, the movable portion 53 can be displaced in the Y direction relative to the support portions 51 and 52 as indicated by an arrow b.

The plurality of first fixed electrode fingers 58 are disposed on one side of the movable electrode fingers 532 in the Y direction and are arranged to form a comb shape that meshes with the respective movable electrode fingers 532 at intervals. The plurality of first fixed electrode fingers 58 are bonded to the upper surface of the substrate 30 at their base end portions.

On the other hand, the plurality of second fixed electrode fingers 59 are disposed on the other side of the movable electrode fingers 532 in the Y direction and are arranged to form a comb shape that meshes with the respective movable electrode fingers 532 at intervals. The plurality of second fixed electrode fingers 59 are bonded to the upper surface of the substrate 30 at their base end portions.

The second acceleration sensor element 302 detects the acceleration in the Y direction in the following manner. That is, when the acceleration in the Y direction is applied to the inertial sensor module 1, the movable portion 53 is displaced in the Y direction while elastically deforming the coupling portions 54 and 55 based on a magnitude of the acceleration. A magnitude of an electrostatic capacitance C3 between the movable electrode fingers 532 and the first fixed electrode finger 58 and a magnitude of an electrostatic capacitance C4 between the movable electrode fingers 532 and the second fixed electrode finger 59 change in accordance with such displacement. Therefore, the acceleration can be detected based on change amounts of these electrostatic capacitances C3 and C4.

1.4.3. Third Acceleration Sensor Element

Next, a configuration of the third acceleration sensor element 303 will be described with reference to FIG. 11.

Figure 11:
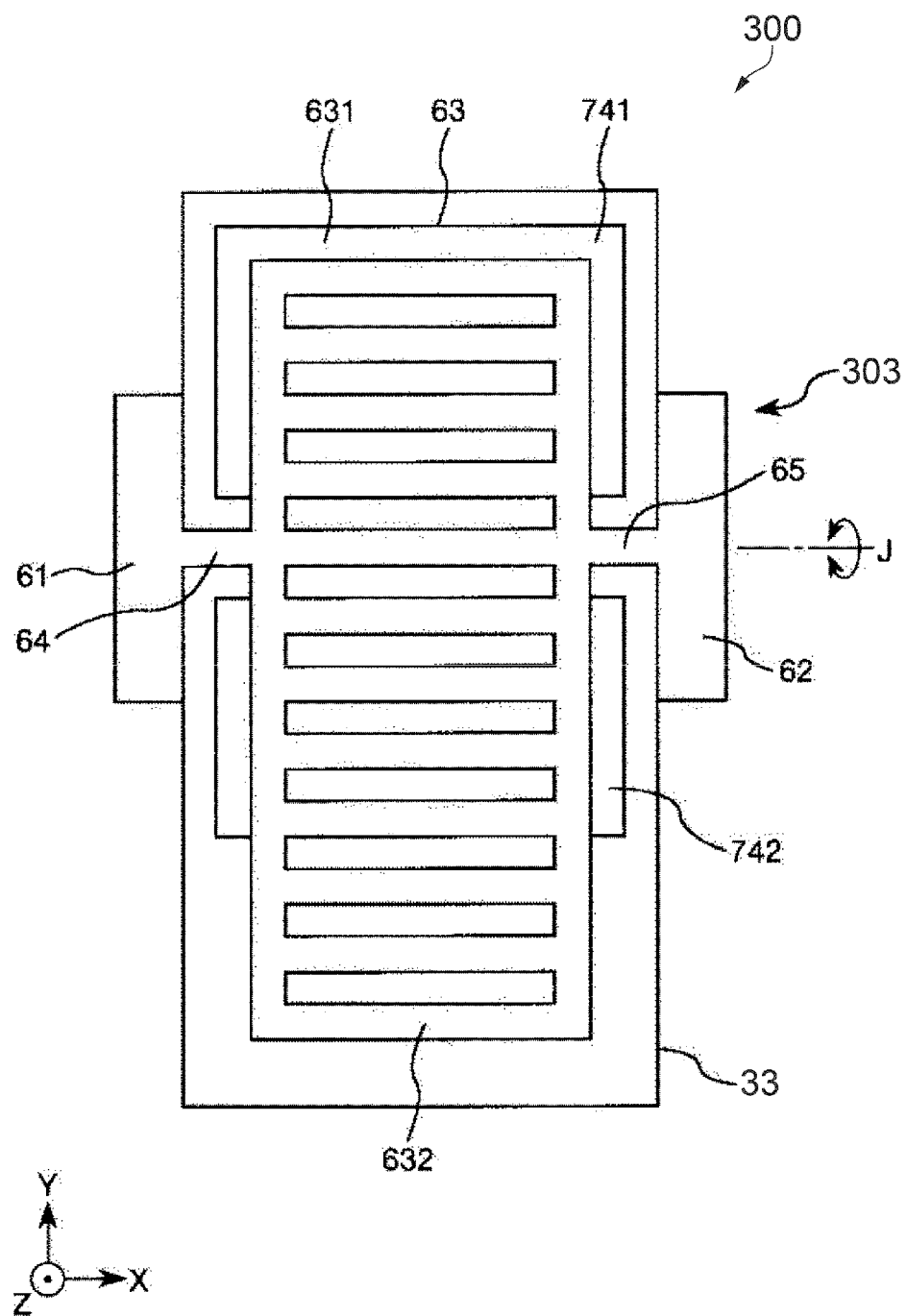
FIG. 11 is a plan view of a third acceleration sensor element included in the third sensor of FIG. 1.

As illustrated in FIG. 11, the third acceleration sensor element 303 includes a pair of support portions 61 and 62, a movable portion 63, a pair of coupling portions 64 and 65 that couple the movable portion 63 with the support portions 61 and 62 so that the movable portion 63 can swing with respect to the support portions 61 and 62. The movable portion 63 swings in a seesaw manner with respect to the support portions 61 and 62 with the coupling portions 64 and 65 as an axis J.

The support portions 61 and 62 are bonded to the upper surface of the substrate 30. The movable portion 63 is provided between these support portions 61 and 62. The movable portion 63 includes a first movable portion 631 located in the positive Y direction side of the axis J and a second movable portion 632 located in the negative Y direction side of the axis J. The first movable portion 631 is disposed to face the first detection electrode 741 provided on the bottom surface of the recess 33 of the substrate 30, and forms an electrostatic capacitance C5 with the first detection electrode 741. The second movable portion 632 is disposed to face the second detection electrode 742 provided on the bottom surface of the recess 33 of the substrate 30, and forms an electrostatic capacitance C6 with the second detection electrode 742. The third acceleration sensor element 303 is formed of, for example, a silicon substrate doped with an impurity such as phosphorus or boron.

The first movable portion 631 and the second movable portion 632 are designed so that rotational moments when the acceleration in the Z direction which is a vertical direction is applied are different from each other and a predetermined inclination is generated in the movable portion 63 in accordance with the acceleration. As a result, when the acceleration in the Z direction occurs, the movable portion 63 swings in a seesaw manner around the axis J. Specifically, in the present embodiment, in the plan view, by setting a length of the second movable portion 632 in the Y direction larger than a length of the first movable portion 631 in the Y direction, the first movable portion 631 and the second movable portion 632 are designed so that the rotational moment of the second movable portion 632 is larger than the rotational moment of the first movable portion 631.

The third acceleration sensor element 303 detects the acceleration in the Z direction in the following manner. That is, when the acceleration in the Z direction is applied to the inertial sensor module 1, the movable portion 63 swings in a seesaw manner around the axis J. By the seesaw swing of the movable portion 63, a separation distance between the first movable portion 631 and the first detection electrode 741 and a separation distance between the second movable portion 632 and the second detection electrode 742 change. Accordingly, the electrostatic capacitances C5 and C6 change. Therefore, the acceleration can be detected based on change amounts of these electrostatic capacitances C5 and C6.

As described above, the accelerations in the X-axis direction, the Y-axis direction, the Z-axis direction, which are three axes orthogonal to one another, can be measured by the third sensor 300.

As described above, in the inertial sensor module 1 according to the present embodiment, the first sensor 100, the second sensor 200, and the third sensor 300 are disposed on the inner bottom surface 2a which is one plane of package 2, and thus the axis alignment accuracy of each sensor can be improved. In addition, by increasing the Z-axis alignment accuracy of the third gyro sensor element 103 that detects the angular velocity around the Z axis of the first sensor 100 and the vibration gyro sensor element 201 that detects the angular velocity around the Z axis of the second sensor 200 with high accuracy, it is possible to achieve high accuracy of the measurement on the angular velocity around the Z axis.

In the present embodiment, the first sensor 100, the second sensor 200, and the third sensor 300 whose sensor elements are sealed in an airtight manner using the lid bodies 10a, 20a, and 30a are described as an example, while the present disclosure is not limited thereto, and the first sensor 100, the second sensor 200, and the third sensor 300 without the lid bodies 10a, 20a, and 30a may be used. The reason is that the first sensor 100, the second sensor 200, and the third sensor 300 disposed at the base substrate 3 can be sealed by the package 2 in an airtight manner.

2. Second Embodiment

Next, an inertial sensor module 1a according to a second embodiment will be described with reference to FIGS. 12 and 13. For convenience of explanation, the lid body 5 and the respective lid bodies 10a, 20a, and 30a of the sensors 100, 200, and 300 are not illustrated in FIG. 12. In addition, the coupling terminals formed at the back surface 2b of the package 2 and the wiring formed at the inner bottom surface 2a and electrically coupling the coupling terminals with the sensors 100, 200, and 300 are not illustrated in FIGS. 12 and 13.

As compared to the inertial sensor module 1 according to the first embodiment, the inertial sensor module 1a according to the present embodiment is the same as the inertial sensor module 1 according to the first embodiment expect that a semiconductor chip 70 is accommodated in the internal space S of package 2 and the first sensor 100, the second sensor 200, and the third sensor 300 are disposed on the semiconductor chip 70. Differences from the first embodiment described above will be mainly described, and descriptions of the similar matters will be omitted.

Figure 12:
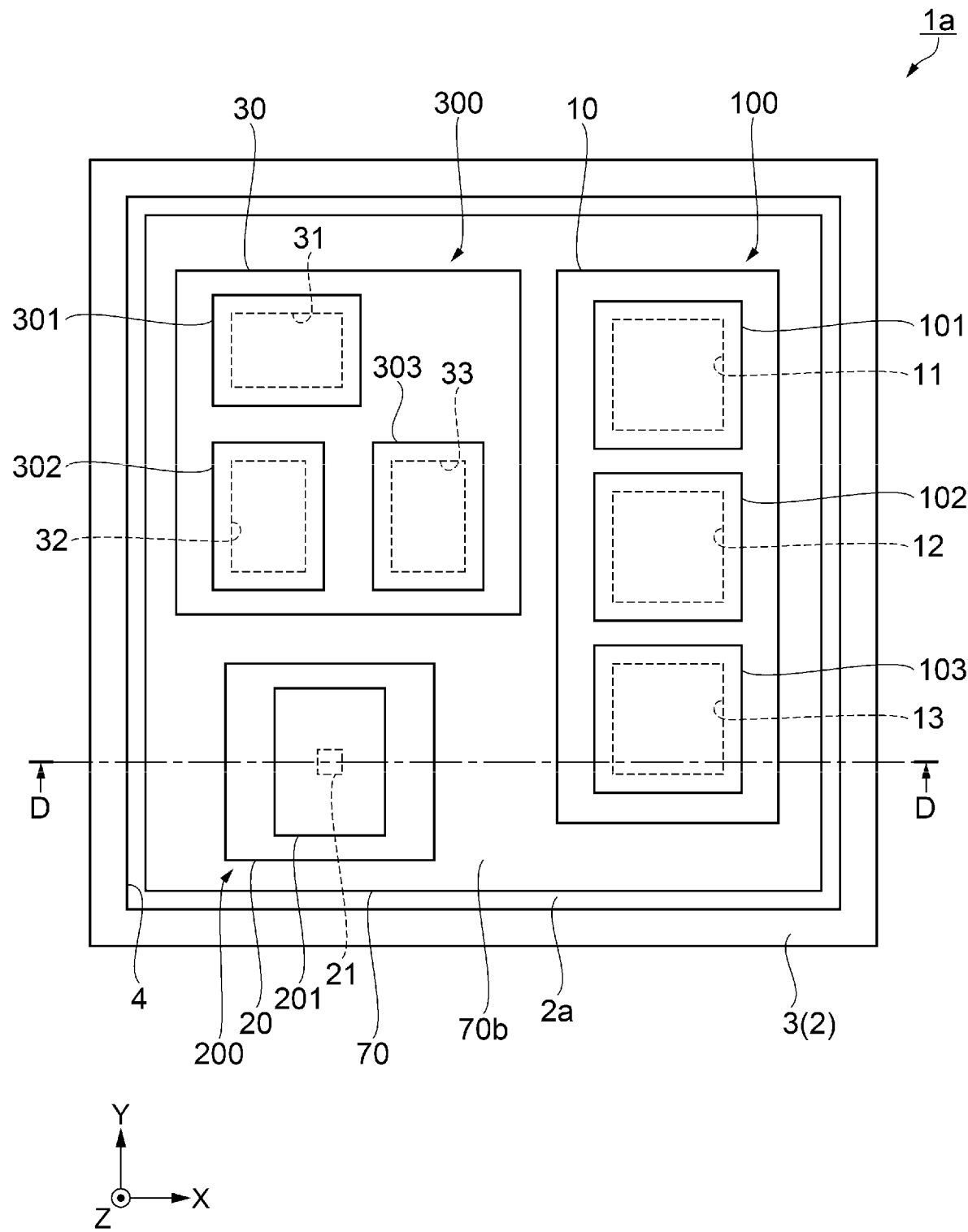
FIG. 12 is a plan view illustrating a schematic structure of an inertial sensor module according to a second embodiment.
Figure 13:
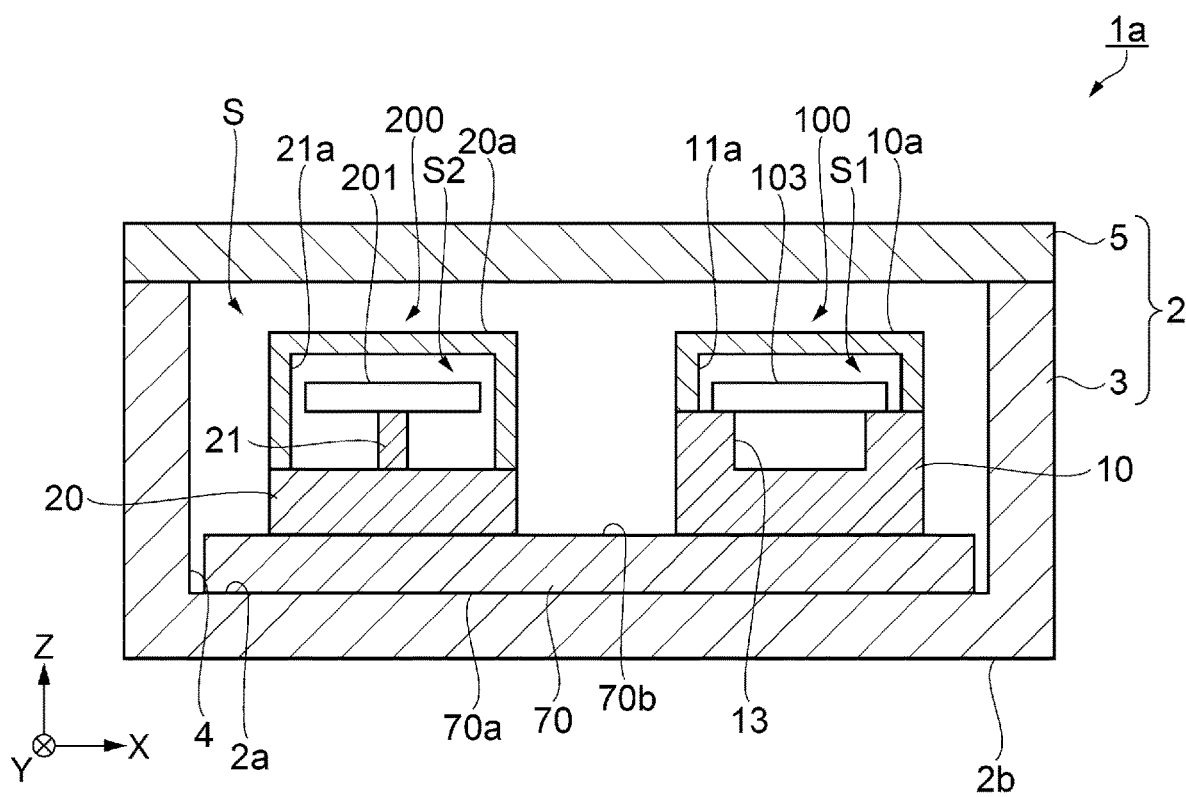
FIG. 13 is a cross-sectional view taken along a line D-D in FIG. 12.

As illustrated in FIGS. 12 and 13, in the inertial sensor module 1a, the semiconductor chip 70 is disposed on the inner bottom surface 2a of the package 2.

The semiconductor chip 70 includes a first surface 70a and a second surface 70b that face each other. The first surface 70a of the semiconductor chip 70 is disposed on the inner bottom surface 2a of the package 2. The first sensor 100, the second sensor 200, and the third sensor 300 are disposed on the second surface 70b which is the same plane of the semiconductor chip 70.

Therefore, the first sensor 100, the second sensor 200, and the third sensor 300 are disposed on the second surface 70b of the semiconductor chip 70, which is one plane in the package 2, and thus the inertial sensor module 1a excellent in axis alignment accuracy can be realized.

The semiconductor chip 70 includes a drive circuit that drives each of the sensors 100, 200, and 300, a detection circuit that detects the angular velocities around the three axes and the accelerations in the three axis directions based on a signal from each of the sensors 100, 200, and 300, an output circuit that converts a signal from the detection circuit to a predetermined signal and outputs the predetermined signal, and the like.

With such a configuration, it is possible to obtain similar effects as those of the inertial sensor module 1 according to the first embodiment.

3. Third Embodiment

Next, an inertial sensor module 1b according to a third embodiment will be described with reference to FIGS. 14 and 15. For convenience of explanation, the lid body 5 is not illustrated in FIG. 14. In addition, the coupling terminals formed at the back surface 2b of the package 2 and the wiring formed at the inner bottom surface 2a and electrically coupling the coupling terminals with the sensors 100, 200, and 300 are not illustrated in FIGS. 14 and 15.

As compared to the inertial sensor module 1 according to the first embodiment, the inertial sensor module 1b according to the present embodiment is the same as the inertial sensor module 1 according to the first embodiment except that three semiconductor chips 71, 72, and 73 are accommodated in the internal space S of the package 2, the semiconductor chip 71 is disposed on the first sensor 100, the semiconductor chip 72 is disposed on the second sensor 200, and the semiconductor chip 73 is disposed on the third sensor 300. Differences from the first embodiment described above will be mainly described, and descriptions of the similar matters will be omitted.

Figure 14:
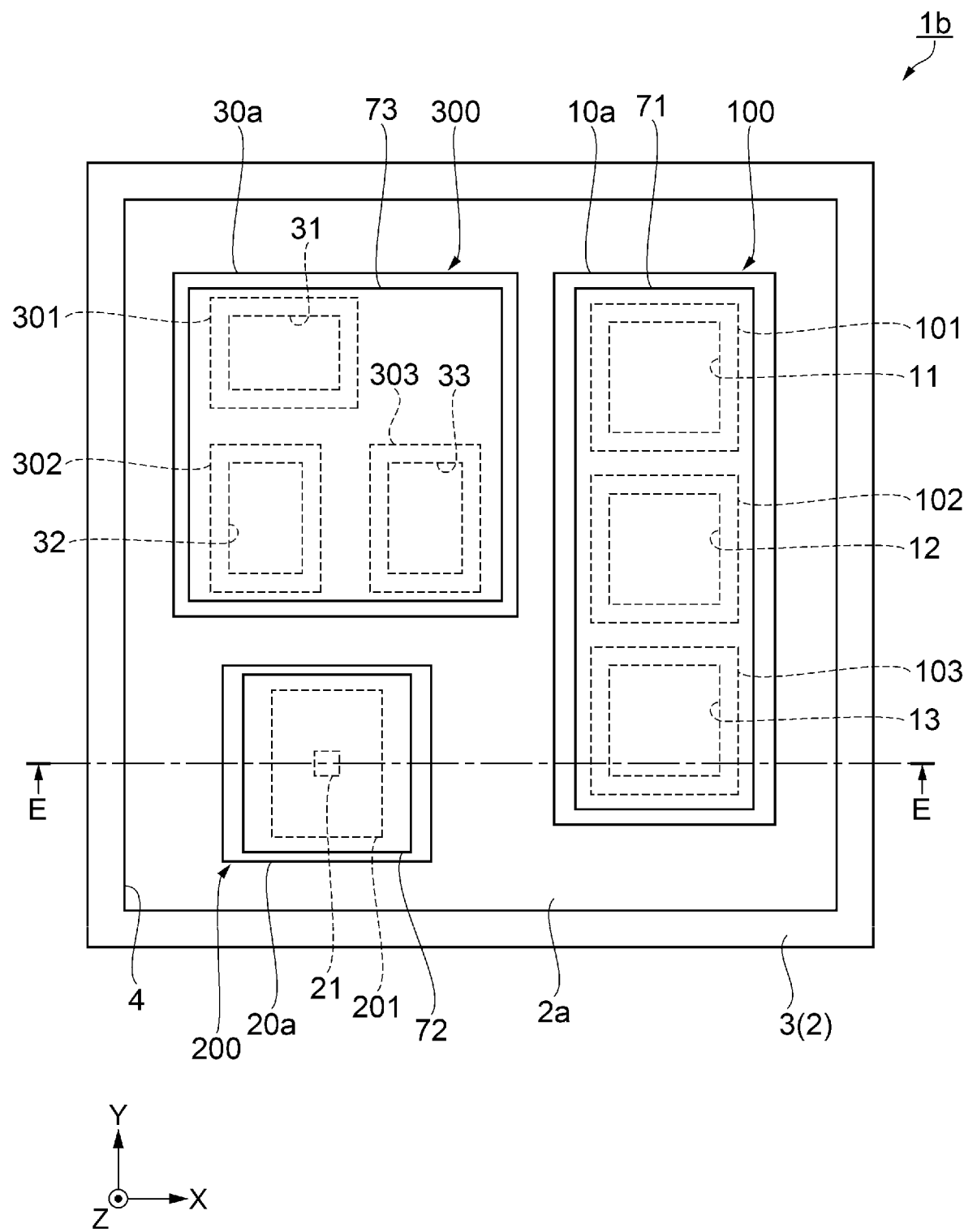
FIG. 14 is a plan view illustrating a schematic structure of an inertial sensor module according to a third embodiment.
Figure 15:
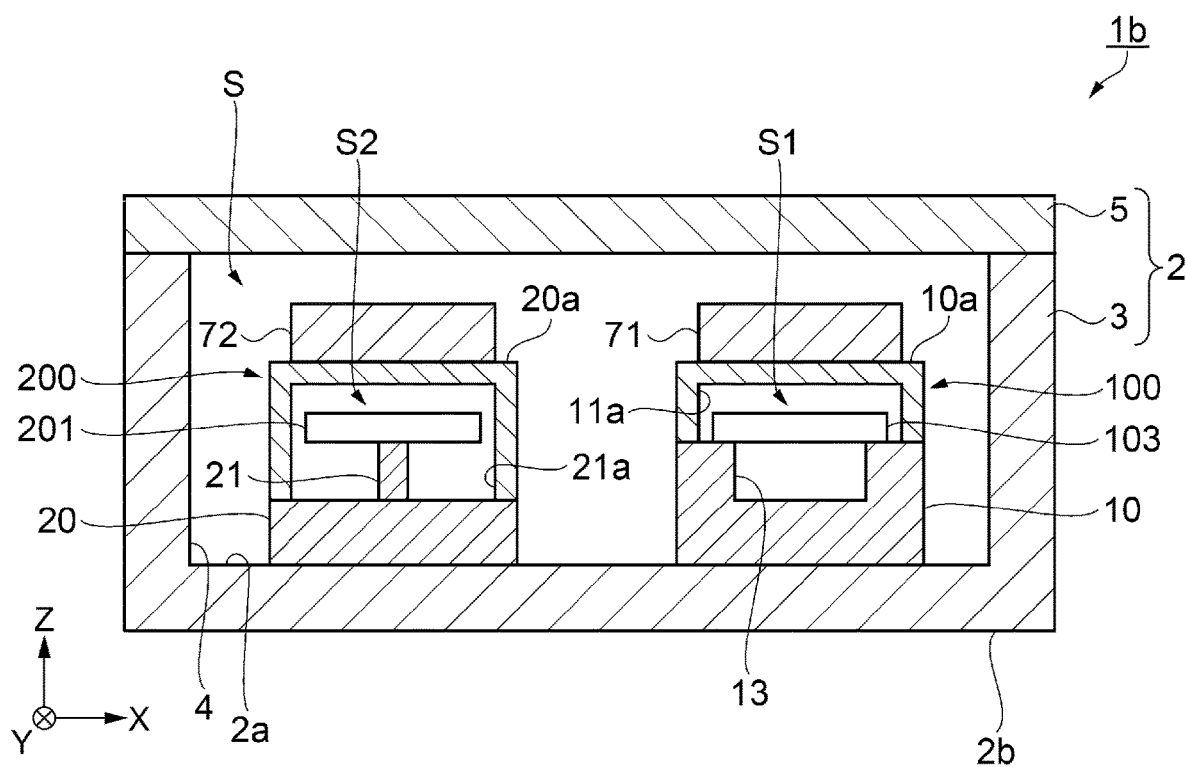
FIG. 15 is a cross-sectional view taken along a line E-E in FIG. 14.

As illustrated in FIGS. 14 and 15, in the inertial sensor module 1b, the first sensor 100, the second sensor 200, and the third sensor 300 are disposed on the inner bottom surface 2a of the package 2.

The semiconductor chip 71 is disposed on the lid body 10a of the first sensor 100.

The semiconductor chip 72 is disposed on the lid body 20a of the second sensor 200.

The semiconductor chip 73 is disposed on the lid body 30a of the third sensor 300.

The three semiconductor chips 71, 72, and 73 are accommodated in the internal space S of the package 2, and thus influence of noise on signals output from the first sensor 100, the second sensor 200, and the third sensor 300 can be reduced, and a size of the inertial sensor module 1b can be reduced.

The semiconductor chip 71 includes a drive circuit that drives the first sensor 100, a detection circuit that detects the angular velocities around the three axes based on the signal from the first sensor 100, an output circuit that converts a signal from the detection circuit to a predetermined signal and outputs the predetermined signal, and the like.

The semiconductor chip 72 includes a drive circuit that drives the second sensor 200, a detection circuit that detects the angular velocity around the Z axis based on the signal from the second sensor 200, an output circuit that converts a signal from the detection circuit to a predetermined signal and outputs the predetermined signal, and the like.

The semiconductor chip 73 includes a drive circuit that drives the third sensor 300, a detection circuit that detects the accelerations in the three axis directions based on the signal from the third sensor 300, an output circuit that converts a signal from the detection circuit to a predetermined signal and outputs the predetermined signal, and the like.

With such a configuration, it is possible to obtain similar effects as those of the inertial sensor module 1 according to the first embodiment.

4. Fourth Embodiment

Next, an inertial sensor module 1c according to a fourth embodiment will be described with reference to FIGS. 16 and 17. For convenience of explanation, the lid body 5 and the respective lid bodies 10a, 20a, and 30a of the sensors 100, 200, and 300 are not illustrated in FIG. 16. In addition, the coupling terminals formed at the back surface 2b of the package 2c and the wiring formed at the inner bottom surface 2a and electrically coupling the coupling terminals with the sensors 100, 200, and 300 are not illustrated in FIGS. 16 and 17.

As compared to the inertial sensor module 1 according to the first embodiment, the inertial sensor module 1c according to the present embodiment is the same as the inertial sensor module 1 according to the first embodiment except that three recesses 81, 82, and 83 recessed downward are provided at the inner bottom surface 2a of a base substrate 3c of a package 2c, and the first sensor 100, the second sensor 200, and the third sensor 300 are disposed in the three recesses 81, 82, and 83, respectively. Differences from the first embodiment described above will be mainly described, and descriptions of the similar matters will be omitted.

Figure 16:
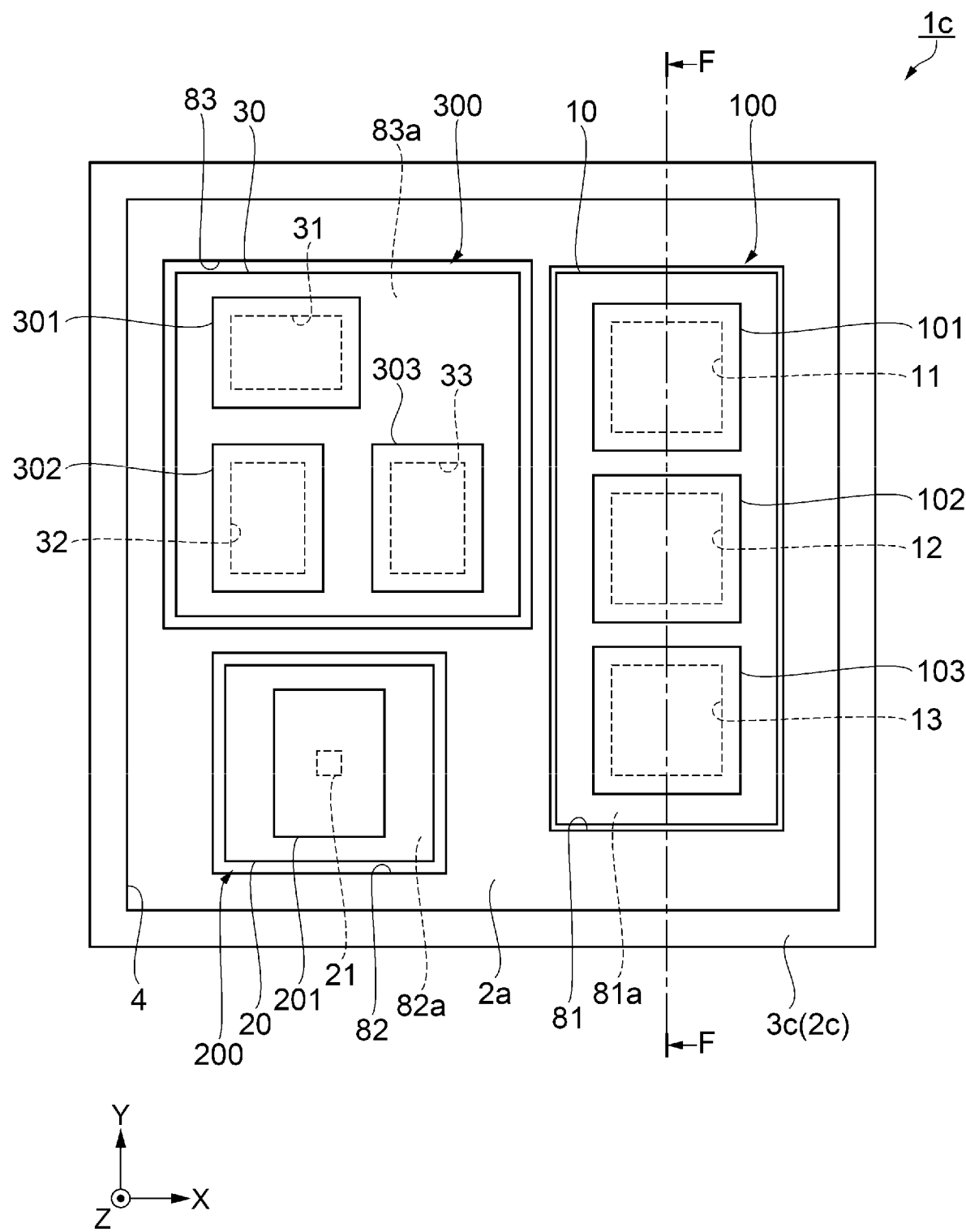
FIG. 16 is a plan view illustrating a schematic structure of an inertial sensor module according to a fourth embodiment.
Figure 17:
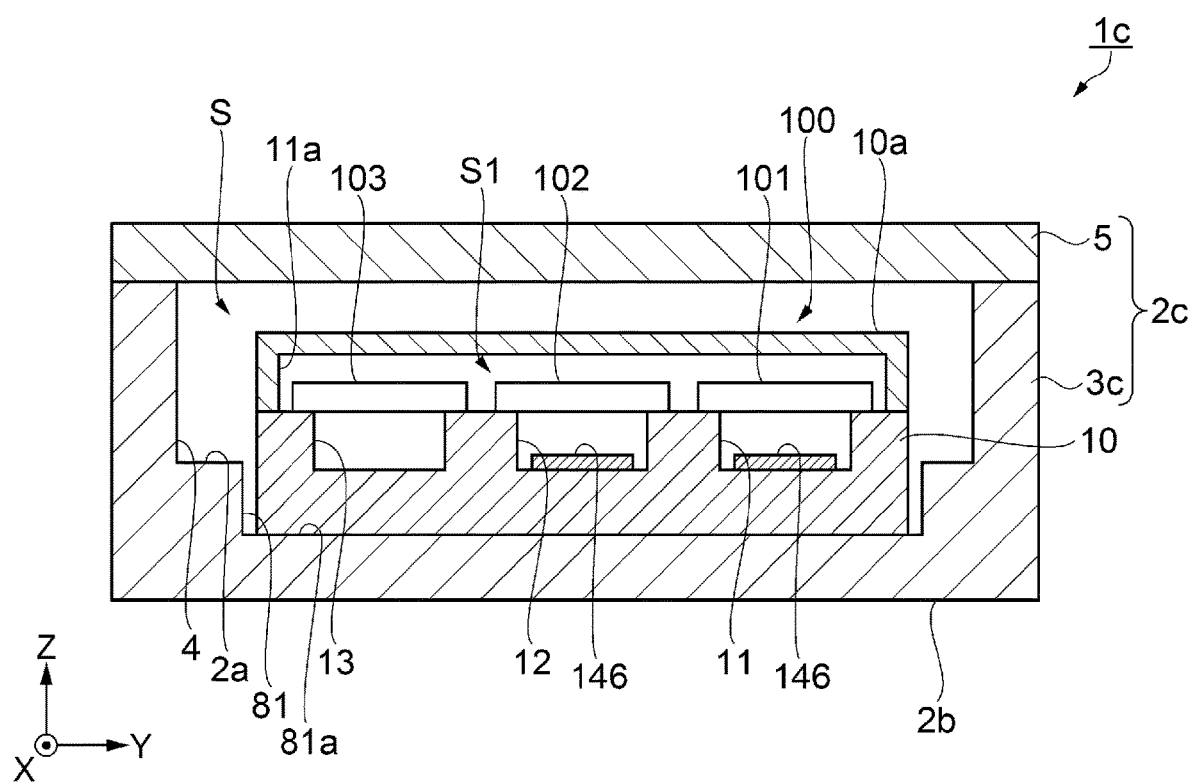
FIG. 17 is a cross-sectional view taken along a line F-F in FIG. 16.

As illustrated in FIGS. 16 and 17, in the inertial sensor module 1c, the three recesses 81, 82, and 83 recessed downward are provided at the inner bottom surface 2a of the package 2c.

Each of the recesses 81, 82, and 83 has a rectangular shape. The first sensor 100 is disposed on an inner bottom surface 81a of the recess 81, the second sensor 200 is disposed on an inner bottom surface 82a of the recess 82, and the third sensor 300 is disposed on an inner bottom surface 83a of the recess 83.

That is, in the inertial sensor module 1c, an alignment structure is provided on the inner bottom surfaces 81a, 82a, and 83a, which are planes on which the first sensor 100, the second sensor 200, and the third sensor 300 are disposed. Therefore, X-axis alignment accuracy and Y-axis alignment accuracy of each sensor also can be improved. In particular, the X-axis alignment accuracy and the Y-axis alignment accuracy of the first sensor 100 and the third sensor 300 can be further improved.

The respective inner bottom surfaces 81a, 82a, and 83a of the recesses 81, 82, and 83 are processed to have the same depth. Therefore, the first sensor 100, the second sensor 200, and the third sensor 300 are disposed on the inner bottom surfaces 81a, 82a, and 83a which are one plane in the package 2, and thus the inertial sensor module 1c excellent in axis alignment accuracy can be realized.

With such a configuration, it is possible to obtain similar effects as those of the inertial sensor module 1 according to the first embodiment.

In addition, the first sensor 100, the second sensor 200, and the third sensor 300 are disposed in the recesses 81, 82, and 83 provided on the inner bottom surface 2a of the package 2c, respectively, and thus the X-axis alignment accuracy and the Y-axis alignment accuracy of each sensor also can be improved.

What is claimed is:

1. An inertial sensor module comprising:
a first sensor having a first axis, a second axis, and a third axis as detection axes;
a second sensor having accuracy higher than that of the first sensor and having the third axis as a detection axis; and
a package including a base substrate and a lid body, wherein
the first sensor and the second sensor are disposed on one plane in the package,
the base substrate is formed with a recess, and the lid body is bonded to an upper surface of the base substrate to seal an airtight internal space between the base substrate and the lid body at the recess,
the first sensor and the second sensor are sealed by the package in an airtight manner, in the airtight internal space between the base substrate and the lid body,
the first sensor and the second sensor detect a same physical quantity, and wherein
the inertial sensor module further comprises an alignment structure provided on the plane on which the first sensor and the second sensor are disposed, wherein
the alignment structure is provided on an inner bottom surface of the base substrate of the package and is a plurality of recesses that are formed at the inner bottom surface having a same depth, and the first sensor is disposed within one of the plurality of recesses and the second sensor is disposed within an other of the plurality of recesses.

\* \* \* \* \*